United States Patent
Cherukkate et al.

(10) Patent No.: US 12,482,460 B2
(45) Date of Patent: Nov. 25, 2025

(54) METHOD AND SYSTEM OF ENVIRONMENT-SENSITIVE WAKE-ON-VOICE INITIATION USING ULTRASOUND

(71) Applicant: Intel Corporation, Santa Clara, CA (US)

(72) Inventors: Sumod Cherukkate, Bangalore (IN); Srikanth Potluri, Folsom, CA (US); Ajesh K K, Bangalore (IN); Xintian Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 17/133,323

(22) Filed: Dec. 23, 2020

(65) Prior Publication Data

US 2021/0225374 A1 Jul. 22, 2021

(51) Int. Cl.
*G10L 15/22* (2006.01)
*G01S 11/14* (2006.01)
*G10L 15/08* (2006.01)
*G10L 15/30* (2013.01)
*G10L 25/51* (2013.01)

(52) U.S. Cl.
CPC ............. *G10L 15/22* (2013.01); *G01S 11/14* (2013.01); *G10L 15/08* (2013.01); *G10L 15/30* (2013.01); *G10L 25/51* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 10,893,147 | B2* | 1/2021 | Lin | H04M 3/567 |
| 2016/0104483 | A1* | 4/2016 | Foerster | G10L 25/03 |
| | | | | 704/275 |
| 2018/0182397 | A1* | 6/2018 | Carbune | G10L 15/22 |
| 2019/0311720 | A1* | 10/2019 | Pasko | G10L 25/60 |
| 2021/0335348 | A1* | 10/2021 | Aggarwal | G10L 15/1815 |
| 2022/0139371 | A1* | 5/2022 | Sharifi | G01S 3/8006 |
| | | | | 704/231 |
| 2022/0189470 | A1* | 6/2022 | Sharifi | G10L 15/22 |

OTHER PUBLICATIONS

Tim Kindberg and Kan Zhang "Validating and Securing Spontaneous Associations between Wireless Devices" C. Boyd and W. Mao (Eds.): ISC 2003, LNCS 2851, pp. 44-53. retrieved from https://link.springer.com/content/pdf/10.1007/10958513_4.pdf (Year: 2003).*

"Introduction to Signal Levels—Discovery of Sound in the Sea", University of Rhode Island and Inner Space Center; retrieved online on Nov. 30, 2020, via https://dosits.org/science/advanced-topics/introduction-to-signal-levels, 5 pages.

(Continued)

*Primary Examiner* — Richemond Dorvil
*Assistant Examiner* — Alexander G Marlow
(74) *Attorney, Agent, or Firm* — Akona IP PC

(57) ABSTRACT

A system, article, and method of environment-sensitive wake-on-voice initiation uses ultrasound signals.

25 Claims, 14 Drawing Sheets

(56) References Cited

OTHER PUBLICATIONS

Getreuer, P. et al., "Ultrasonic Communication Using Consumer Hardware", IEEE Transactions on Multimedia, vol. 20, No. 6, Jun. 2018, pp. 1277-1290.
Lazik, P. et al., "Indoor Pseudo-ranging of Mobile Devices using Ultrasonic Chirps—Carnegie Mellon University", Sensys 2012: Proceedings of the 10th ACM Conference on Embedded Network Sensor Systems, pp. 99-112 (2012).
Intel, Intel Unite Plugin for Ultasonic Join, Mar. 2018, 16 pages.

* cited by examiner

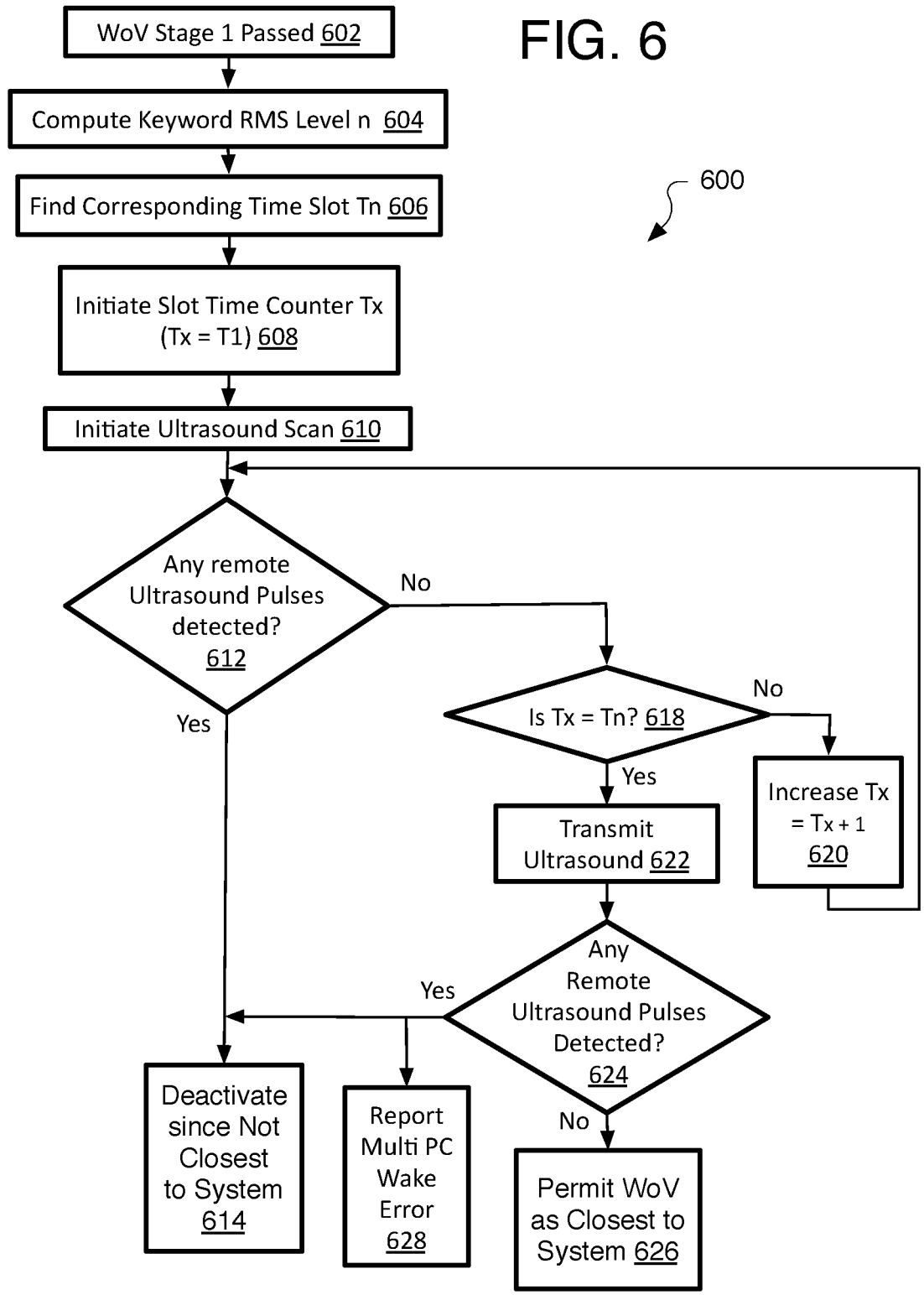

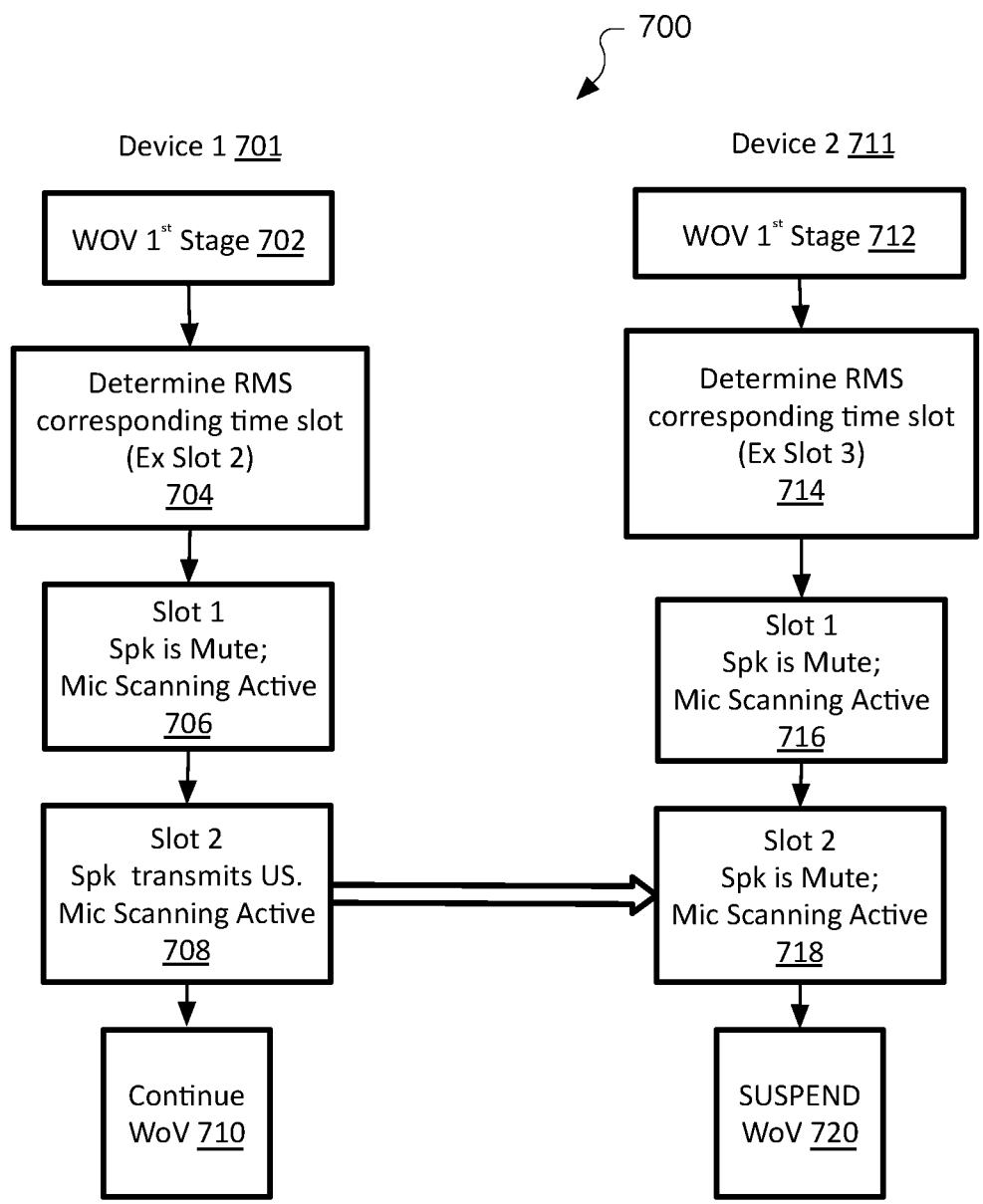

FIG. 7B
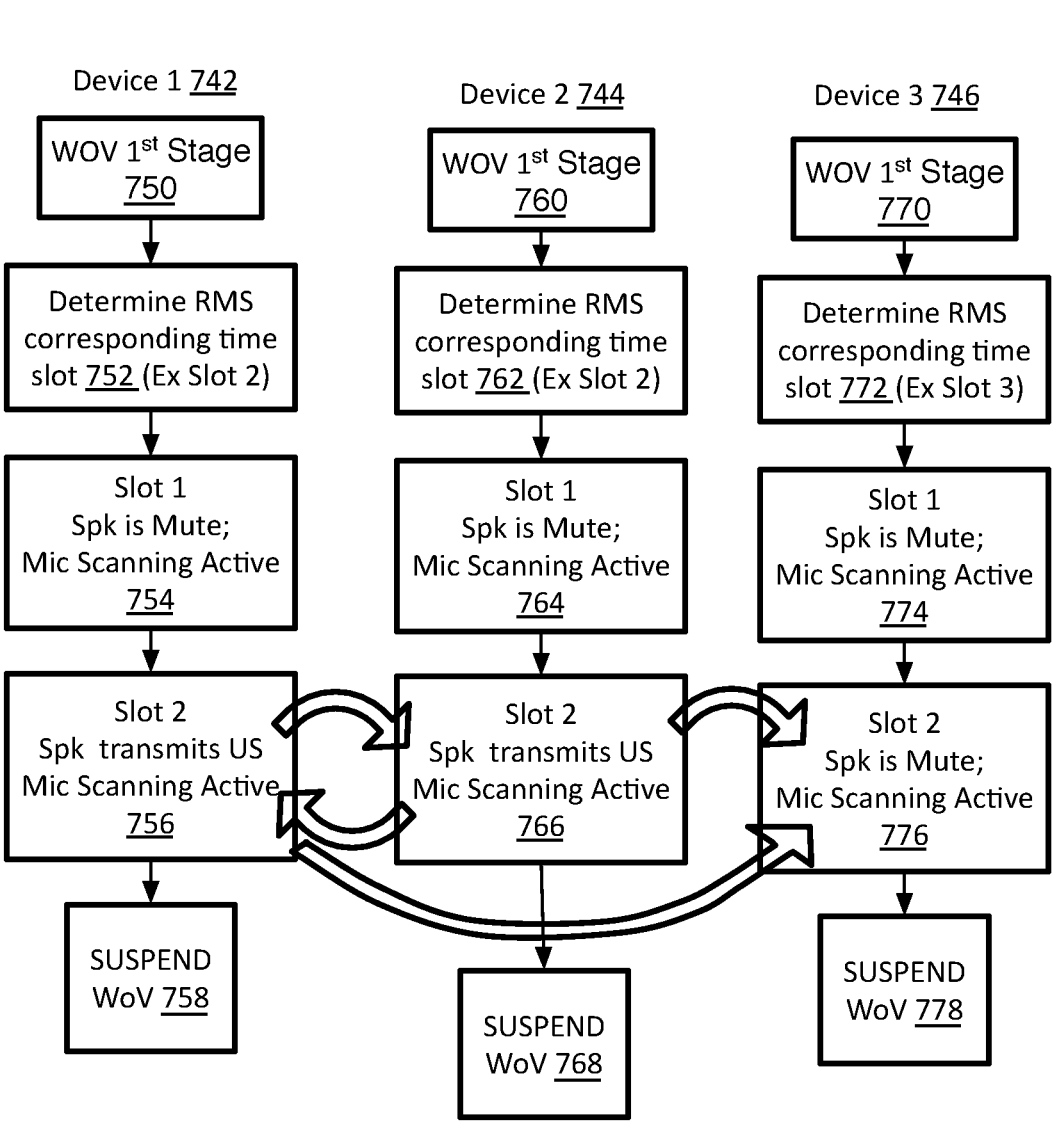
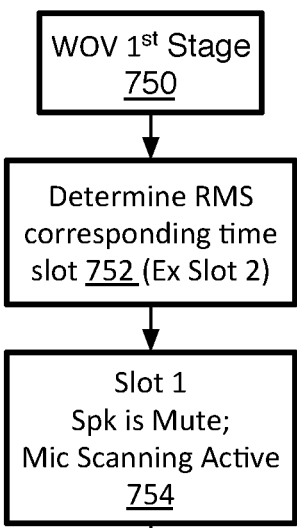
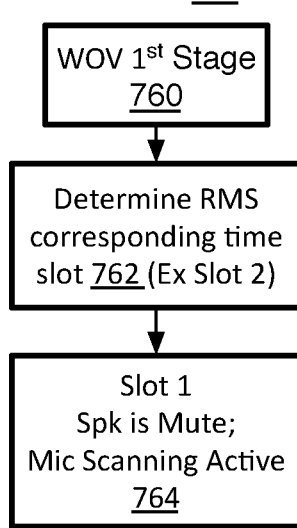
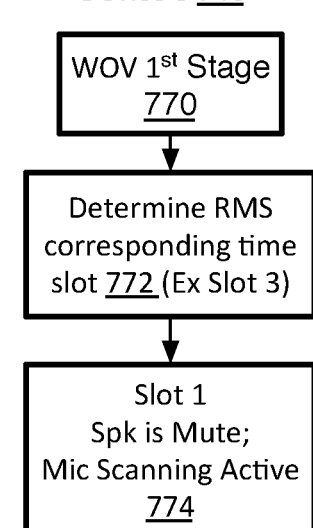
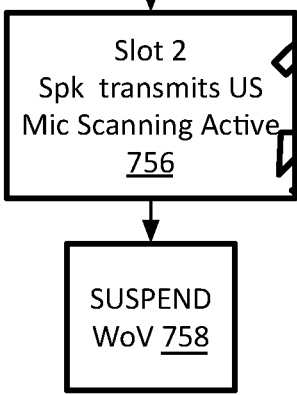
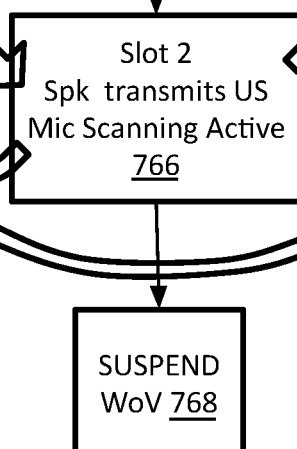
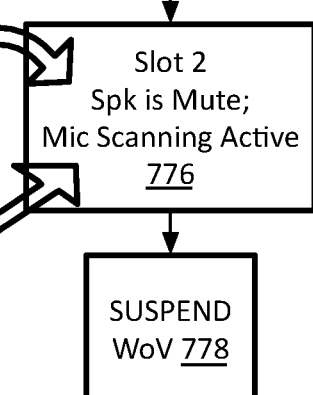

METHOD AND SYSTEM OF ENVIRONMENT-SENSITIVE WAKE-ON-VOICE INITIATION USING ULTRASOUND

BACKGROUND

Keyphrase detection such as Wake-on-Voice (WoV) or hot word detection systems may be used to detect a word or phrase, or the like referred to as a waking phrase. The detection of such a waking phrase may initiate an activity by a device. For example, the device may wake by transitioning from a low power listening state or sleep mode to an active mode, and in many cases, activates a particular computer program such as a personal assistant (PA) application to answer a question or comply with a request stated by a user. Often a PA will reply by emitting an audio response to ask for more information to fulfil the request or answer the question. However, as more and more devices use wake-on-voice in an always-on mode, such as when laptops are closed (referred to as closed-lid WoV), more scenarios or environments exist when the PAs may waken unintentionally and emit an audio response in a situation when it is undesirable to do so causing an unwanted annoying, and sometimes time-wasting, interruption of an event such as at a business meeting.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 6 is an example flow chart of a method of environment-sensitive wake-on-voice initiation that detects the closest ultrasound computing device to a source according to at least one of the implementations herein;

FIG. 7A is a flow chart of an example implementation of the method of FIG. 6;

FIG. 7B is another flow chart of another example implementation of the method of FIG. 6;

DETAILED DESCRIPTION

Figure 1:
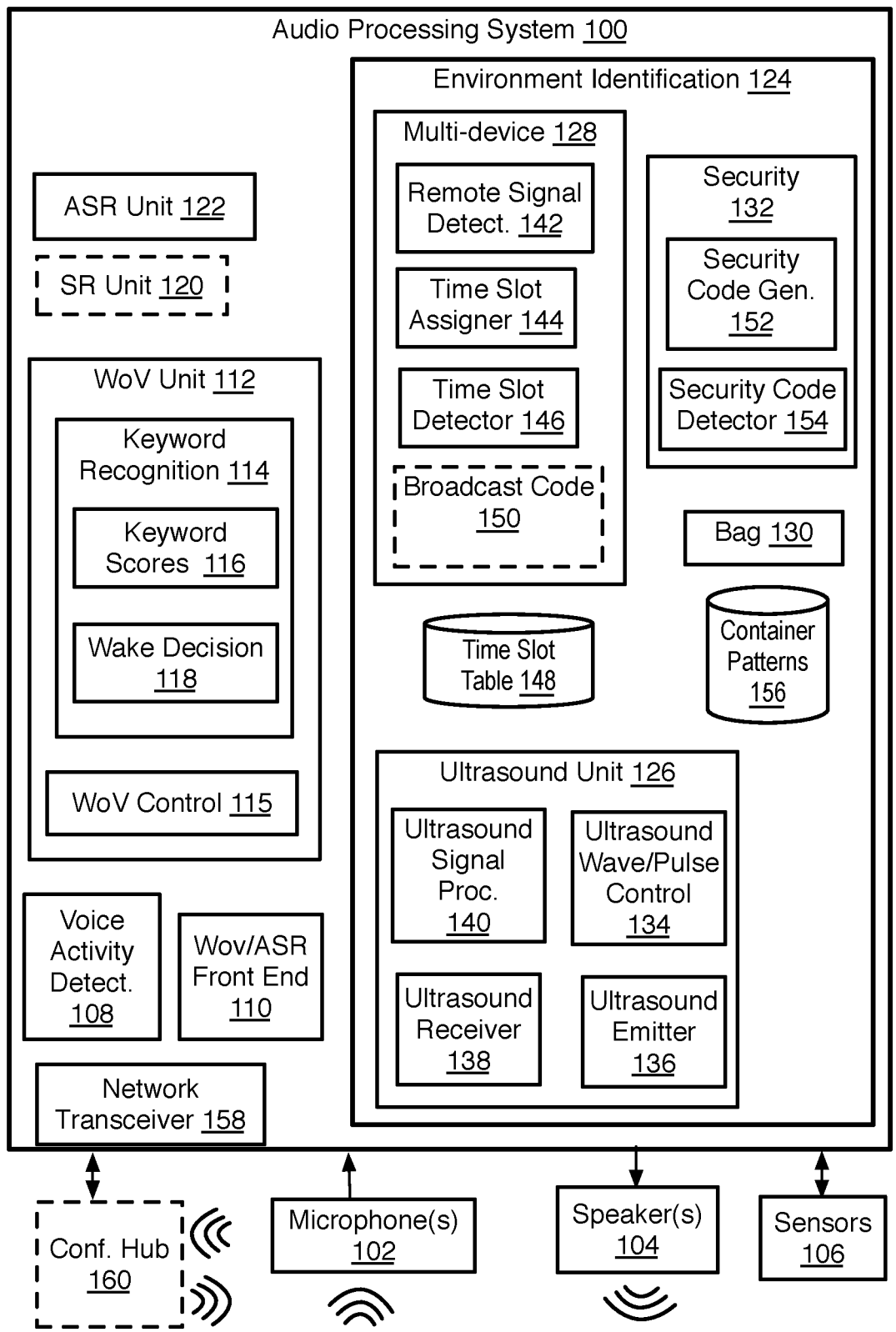
FIG. 1 is a schematic diagram showing an audio processing system that performs environment-sensitive wake-on-voice initiation according to at least one of the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptops, tablets, or other mobile devices including smartphones, and wearable devices such as smartwatches, smart-wrist bands, smart headsets, and smart glasses, but also desk top computers, video game panels or consoles, television set top boxes, dictation machines, or any other audio specific-function application such as vehicle, medical, or environmental building control systems, internet of things (IoT) devices, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, mediums, and methods of environment-sensitive wake-on-voice initiation are described below.

As mentioned, difficulties with always-on wake-on-voice (WoV) applications are becoming more frequent, especially with always-on closed-lid laptop WoV, although the problem is not limited to laptops. Often, the WoV is activated unintentionally by a person speaking near a laptop with WoV abilities, and the WoV application mistakenly and inaccurately identifies waking keywords in the received audio of the person's speech. In other instances, the keyword may be directed at one certain smart device or computer when a group of these devices are within listening distance of each other and all awaken unintentionally when the request was directed only to the one device.

In these cases, this unintentional keyword recognition then wakens a response application such as a personal assistant (PA) application that provides an audio response to the keywords, and in some cases as well as any words spoken just after the keywords, which may be recognized by an automatic speech recognition (ASR) system on the device. In response to the received audio then, a PA often will audibly state something through the device's speakers that does not make sense or that requests further information. When people within hearing distance of this audio emitting device are listening to something else at the same time, such as the intended device audibly responding, a person speaking, or another application emitting sound on the same or other computing device, whether for business or entertainment for example, this interruption can be extremely annoying and disruptive to whatever activity the people are engaging in such as a meeting, especially when it keeps reoccurring. If the computing device, or more specifically the WoV application, knew the environment around the computing device included multiple people and multiple computing devices, the WoV application could act more appropriately by remaining quiet or permitting only a device of a particular user to answer that user's audio request. The waking of multiple devices by an WoV system also wastes energy on each of the devices waking unintentionally whenever a device undesirably changes from a low power mode to a high power mode in order to analyze audio based on the WoV system.

Another challenge for computing device PAs relates to voice authentication, and specifically continuous passive update of voice biometrics information for accurate user verification. Typically, a computing device may listen to a user talking merely to collect data to improve speaker recognition algorithms or neural networks to increase speaker recognition accuracy. When a group of people are together around a computing device and the speaker recognition is not sufficiently trained yet for a particular user, the computing device does not know the environment and may train on invalid data. If the environment was known, such as when multiple people are present, the passive voice biometric training could be turned off.

Some other specific scenarios or environments when unintentional waking by a WoV system occurs is when the WoV device, such as a laptop is closed and is either being stored or carried in a computer bag such as a laptop case or backpack for example. Usually, the person carrying the WoV device will have no expectation of using the PA on this device. This of course may depend on the device, where a response from a laptop that is put away is more clearly undesired than a response from a mobile phone in a backpack for example.

Also, the unintentional waking provides difficulties with security issues since audio could be unintentionally emitted on the WoV device and that is considered private. Particularly, voice biometrics, mentioned above, could be used to make a WoV device respond only to its authorized user. However, no 100% accurate voice biometric solution exists. The best solutions achieve approximately 90% accuracy. Also, many users do not enable or properly train the voice biometrics on their WoV devices. This results in about a 10% chance of erroneous verification, and in a multi-personal computer (PC) environment for example, two or more PC's often will wake simultaneously for the same spoken keyword. Thus, voice biometric solutions are not fully secure, and the primary, and relatively primitive, privacy defense mechanism in these cases is still the microphone mute button.

These problems all occur because the WoV device cannot assess whether waking an audio application on the WoV device is undesirable in a current environment at the location of the WoV device. Attempts to solve these issues include using other sensors that detect motion or location of the device. This typically involves adding specialized hardware and circuitry to the device as well as large system changes to operate the sensors and analyze the sensor data, resulting in large costs to modify existing devices to assess an environment for its WoV application.

Other conventional systems use microphone recording levels for devices communicating with the same cloud and that can all be controlled at a single device. This system compares the recording levels to detect which of multiple devices is closest to a user. While the system is adequate for a home environment, this solution does not work in a business environment that has different networks or communication channels for its multiple devices, where the number of devices could run into the thousands, and where each device is controlled mostly by a single respective user thereby limiting a solution to a group of devices with varying network capabilities.

To resolve these issues, the method and systems herein use ultrasound emissions (referred to herein interchangeably as ultrasonic sound or audio) to assess the environment or scenario around a computing device with WoV ability. Ultrasound has a wavelength approximately greater than about 18 kHz, and by one form, up to about 200 kHz. It has been found that typical existing speakers on conventional computing devices, such as laptops or smartphones, can emit ultrasound from about 18 kHz up to about 24 kHz. Humans can hear sounds up to about 18-20 kHz so that ultrasound at about 20-24 kHz can be used by existing speakers and existing microphones as a sensing mechanism as well as for communication among computing devices or to transmit data between the computing devices, all without being noticeable to people. Some computers have ultrasound emission systems, but the ultrasound in these cases is not related to WoV and speech recognition.

The ultrasound solution involves inserting scenario-based (or environment-sensitive) checkpoints in the WoV process. This can be performed in parallel to WoV keyword recognition so that time delay is not added to the WoV process. Also, an ultrasound system described herein can be added to existing computing devices by updating or adding software applications, even on legacy systems, rather than requiring any expensive hardware or audio equipment upgrading. The methods herein may be implemented without any dependency on an operating system or third party personal assistant applications. Further, a push PC-centric speech solution can be used at the individual PCs (or computing devices) rather than on a cloud-centric solution so that individual users can obtain better customized experiences. Required use of a cloud or central network may be used merely when a PC cannot handle all operations of the ultrasound WoV.

Different features or tasks using ultrasound transmissions will need to be performed to assess different environments, and once the environment is assessed, a computing device with WoV may provide activation or deactivation of the WoV system depending on the environment. Each of these tasks may by limited to a simple handshaking protocol to reduce computational loads and avoid delay. Thus, by one form, as soon as a user utters a keyword, all ultrasound computing devices within listening distance activate an ultrasound listening mode. Some of the environments (or scenarios) will search for ultrasound chirps, while other environments will use data transmitted through ultrasound signals.

For specific examples, when multiple users have multiple computing devices present at a same location so that the devices are within listening distance of each other, whether at a meeting, classroom, or other situation, each device may use ultrasound signals that transmit a device ID to determine if multiple ultrasound computing devices are present. Each device can then act appropriately given the environment such as by deactivating their WoV audio responses to avoid annoyance or disruption of the users' activities. Also, detection of a multi-device environment also can aid in passive enumeration and passive update of a user's voice biometrics information by better ensuring that the speaker recognition training only occurs while the user of a specific device is talking.

By another example form, the ultrasound signals are used to determine which of a number of computing devices is the closest device to an audio source, such as a person talking, and that should be the only device to respond to the detection of keywords in the audio. The WoV on the other devices are then deactivated. This may be accomplished by having each computing device transmit an ultrasound signal during a different time slot as soon as a keyword is detected where each time slot corresponds to a fixed audio signal pressure level, such as a root-mean-square pressure (RMS) level of the audio. This assumes that the computing device closest to the person speaking will be on that person's computing device and will have the loudest audio with the keywords. By another form, the de-activation of the WoV application and activation on a closest device may be limited to only those computing devices that are on the same computer network or proximity group. This may be determined by receiving and re-transmitting an ultrasound pin or unique signature to establish membership in a proximity group, and then obtaining device and/or user IDs, derived from voice biometrics (speaker recognition), and from multiple devices authorized to join the network and via non-audio wave computer network transmission (such as personal area networks (PANs) such as Bluetooth® or WiFi).

By yet another form in broadcast environments, such as office conference rooms or classrooms, ultrasound may be used to indicate a broadcast environment is present by transmitting a code or unique ultrasound signature to multiple computing devices in the room. In this case, all of the devices will deactivate their WoV application responses, or turn off their loudspeakers, so that the devices do not emit sound that could interrupt a person talking in the room. This may be referred to as microphone monitoring only, to take down notes for example, but with no loudspeaker response.

As an authentication feature, a first computing device may transmit a pass code to a second device such as a smartphone or other external computing device over a computer network. The external device then may automatically transmit the code via ultrasound back to the first computing device to authenticate a user attempting to awaken applications on the first computing device. This establishes automatic secondary level user authentication without a user's intervention.

By another feature, ultrasound signals transmitted from a computing device and reflected back to the computing device can be analyzed. If the reflected signal has signatures (sound waves) that match audio signal patterns of a container holding the computing device, it is assumed the computing device, such as a closed laptop, is in a carry bag or placed in storage. In this case, the WoV is disabled and the computing device will not respond when keywords are detected in any further incoming audio. Detection of the motion of the laptop by other sensors may be used to confirm this environment.

Referring to FIG. 1, an environment-sensitive audio processing system 100 performs the method of environment-sensitive wake-on-voice initiation described herein. While the audio processing system 100 may be, or may be part of, any computing device that processes audio, the system (or ultrasound computing device) 100 herein will be a personal computer (PC) such as a laptop with a screen that closes the laptop, unless context indicates otherwise. Here, the audio processing system 100 may have an audio capture device 102 such as one or more digital or analog microphones to receive sound waves such as speech from a user that may or may not include keywords to awaken an application on the computing device. The microphones may convert the waves into a raw electrical acoustical signal that may be recorded in a memory and analyzed. The audio processing system 100 may have one or more loudspeakers 104 to emit sound waves including ultrasonic signals or waves including pulses.

Sensors 106 also may be provided to detect the motion, location, and/or orientation of the computing device as well as other environment conditions to assist with determining the environment indicators for WoV operation. Specifically, the sensors that indicate the position or location of the audio device, in turn, suggests the location of the user, and presumably the person talking into the device and the source of the audio. This may include a global positioning system (GPS) or other sensors that may identify the global or relative coordinates of the device, a proximity sensor that may detect whether the user is holding the device to the user's face like a phone, or a galvanic skin response (GSR) sensor that may detect whether the phone is being carried by the user at all. The geographic environment near the device (hot desert or cold mountains), whether the device is inside of a building or other structure, and the identification of the use of the structure (such as a health club, office building, factory, or home) may be used to deduce the activity or location of the user as well, such as exercising. For these purposes, the sensors 106 also may include a thermometer and barometer (which provides air pressure and that can be used to measure altitude) to provide weather conditions and/or to refine the GPS computations. A photo diode (light detector) also may be used to determine whether the user is outside or inside or under a particular kind or amount of light.

Other sensors may be used to determine whether the user is running or performing some other exercise such as the accelerometer, gyroscope, magnetometer, an ultrasonic reverberation sensor, or other motion sensor, or any of these or other technologies that form a pedometer. Other health related sensors such as electronic heart rate or pulse sensors, and so forth, also may be used to provide information about the user's current activity. Sensor or sensors 106 may provide sensed data to the environment identification unit for WoV, but also may be activated by other applications or may be activated by a voice activity detection unit 108 as needed. Otherwise, the sensors 106 also may have an always-on state. At minimum, the sensors may include any sensor that may indicate information about the environment in which the audio signal or audio data was captured.

The system 100 also may have the voice activity detection unit 108 to first detect that a person is speaking. A WoV/ASR front end unit 110 then performs pre-processing, divides the audio signal into frames, extracts features from the audio signal, and generates acoustic scores of lingual portions of the audio signal such as phoneme. A WoV unit 112 then uses decoders to attempt to determine whether or not keywords are spoken in the audio signal.

The WoV unit 112 may have a keyword recognition unit 114 with a keyword scores unit 116 that forms at least a first stage mainly performed by minimal hardware such as fixed-function neural network accelerators specifically trained to recognize WoV keywords and that provide a keyword score for audio signals that may be a keyword. A second stage or wake decision unit 118 may be mainly software that uses one or more general purpose CPUs or digital signal processor (DSP) s to analyze the keyword scores and determine if the keyword actually (or most likely) is present. A WoV control 115 then places the changes the device 100 from lower power mode (if in such a mode) to a high or normal power mode, and activates (or permits) the PA or other application to respond to the audio signal when the keyword(s) are present. The WoV control 115 may receive environment indicator signals from an environment identification unit 124 (also referred to as an environment detection unit) that either indicates the WoV should be deactivated or remain activated depending on the detected environment of the device or system 100. Accordingly, the WoV control unit 115 will act accordingly depending on the environment indicator.

Otherwise, a speaker recognition (SR) unit 120, also referred to as a voice biometrics unit, also may be provided to differentiate the user of the device from other users or to authenticate the speaker if authorization is required. Once keywords are detected, words spoken after the keywords may be analyzed by the front end 110 and then an automatic speech recognition (ASR) unit 122 with decoders and a language interpreter that may recognize the words. Thereafter, a PA application (not shown) may be used to determine the meaning of the words and respond or activate other applications as requested by a user. This may include providing audio feedback on the loudspeaker 104.

In more detail, the environment identification unit 124 on the system 100 has an ultrasound unit 126 that prepares the ultrasound signal for transmission and converts an incoming ultrasound signal into digital form that can be analyzed. The environment identification unit 124 also has a multi-device unit 128 that handles detection and control of signals among multiple computing devices, a security unit 132 that provides a secondary authentication of a user, and a bag unit 130 that analyzes whether a computing device is being stored or moved in a container. A time slot table 148 may be provided in memory to provide RMS to time slot correspondence lists, and container patterns 156 may be stored and used by the bag unit 130.

In more detail, the ultrasound unit 126 may have an ultrasound wave/pulse control 134 that determines the parameters of the ultrasound waves, and an ultrasound emitter 136 that sets the ultrasound wave parameters to emit the ultrasound waves at the speaker(s) 104. The ultrasound unit 126 also may have an ultrasound receiver 138 that receives digital or analog audio signals from the microphone (s) 102 and converts them to digital signals that can be analyzed. An ultrasound signal processing unit 140 pre-processes the ultrasound audio signal so that the signal can be pre-processed and analyzed, such as with de-noising, filtering, or smoothing of the signal for example.

The multi-device unit 128 may have a remote signal detection unit 142 that determines whether or not multiple ultrasound computing devices are present such as by detecting ultrasound signals with device IDs of other nearby devices. A time-slot assigner unit 144 determines the RMS level of audio received by the computing device 100 and uses the time slot table 148 to assign a time slot to the device 100 depending on the RMS. A time slot detector unit 146 determines the time slot of the other computing devices that are present and by using ultrasound signals received from the other computing devices to determine whether the present computing device is closest among the computing devices to a source of the audio. A broadcast code unit 150 generates codes to transmit by ultrasound signal to other devices and manages a broadcast code received from other devices for various implementations described below. This may include sending or receiving a code to confirm device membership of multiple devices in a same network, meeting, or class for example.

The security unit 132 may have a security code generation unit 152 that generates or retrieves a security code and controls transmission of the code through a computer network and via network transceiver 158 for example. A security code detector 154 may control transmission of the code via ultrasound or receipt of the ultrasound code for verification of the identity of another user's device.

While in some cases, the audio processing system 100 may generate broadcast ultrasonic signals for transmission peer-to-peer, in other cases, the system 100 may communicate (wired or wirelessly) with a meeting hub 160 that is an application on a remote device, typically placed in a business conference room and may communicate with meeting display devices by one example. The hub 160 may have its own ultrasound transmission ability to establish a proximity group of devices that are considered to be in a meeting, and by transmitting a pass code via ultrasonic signal to multiple devices to establish the membership in the meeting. Each device may communicate data over a computer network back to the hub and/or to the other devices in the proximity group of the hub. By another alternative, whether or not from a hub, the receipt of a pass code can be used by a device 100 herein to control access to WoV detection operations as described below.

Figure 2:
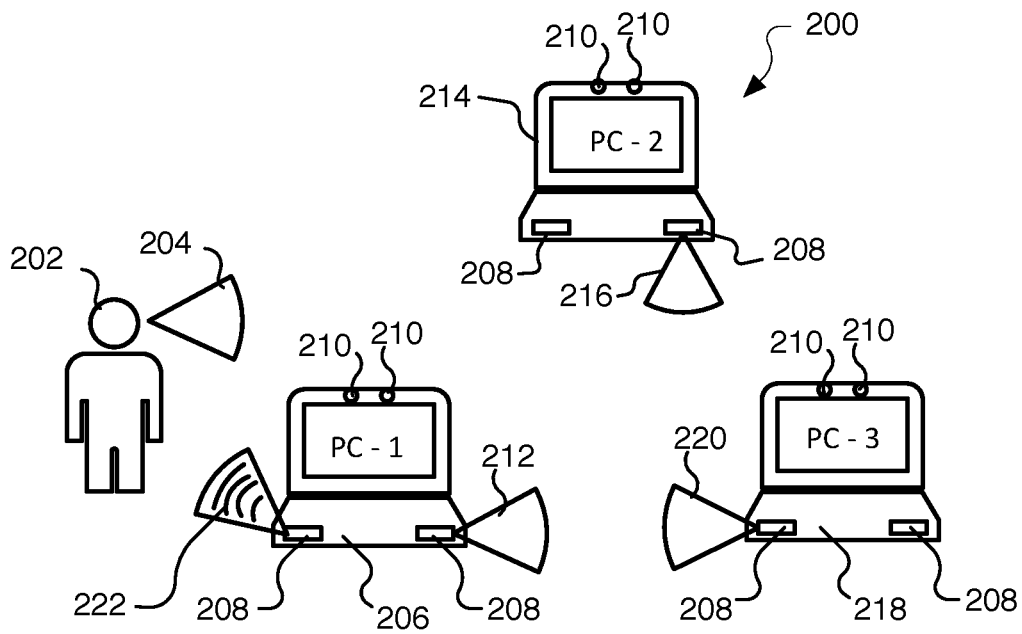
FIG. 2 is a schematic diagram of an example multi-device environment in which a method of environment-sensitive wake-on-voice initiation may be performed according to at least one of the implementations herein.

Referring to FIG. 2, a multi-device environment 200 is shown in which system 100 may be used. The environment 200 has a user 202 that speaks keywords 204, such as "Hey Alexa" or "Hey Siri" to name a few examples. The environment 200 also has multiple ultrasound computing devices PC-1 206, PC-2 214, and PC-3 218, such as device 100. Each computing device 206, 214, or 218 is shown with speakers 208, microphones 210, and respectively with ultrasound emissions 212, 216, and 220 undetectable by the human ear. All of the ultrasound computing devices 206, 214, and 218 would react audibly to the keywords 204 if not for the present method controlling the reactions. Thus, the WoV audio response from devices 214 and 218 are deactivated, while ideally only the closest device 206 has an audio response 222, thereby avoiding the annoyance of multiple devices reacting. The environment 200 is used to demonstrate the methods described below.

Figure 3:
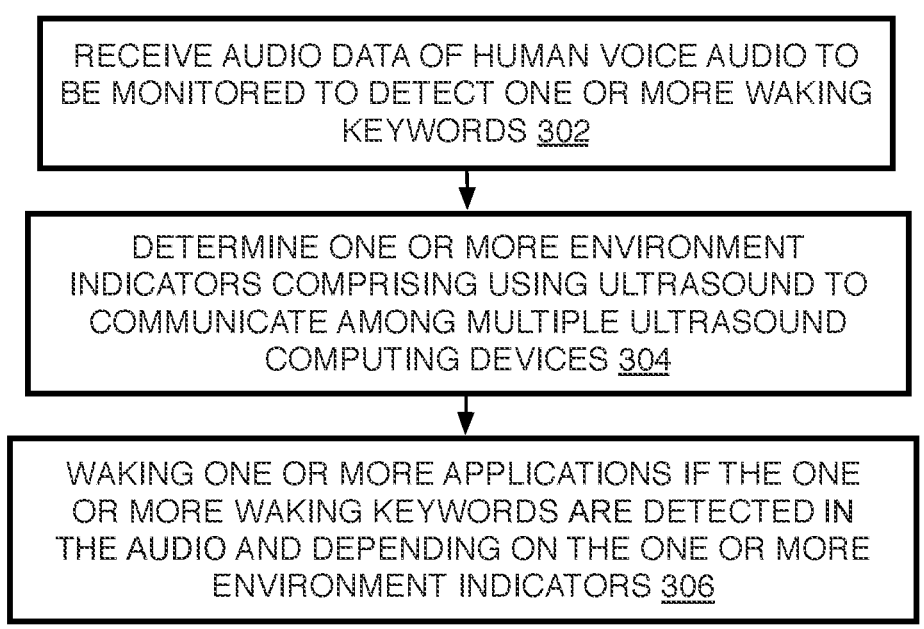
FIG. 3 is an example flow chart of a method of environment-sensitive wake-on-voice initiation according to at least one of the implementations herein.

Referring to FIG. 3, an example process 300 for a computer-implemented method of environment-sensitive wake-on-voice initiation is described below. In the illustrated implementation, process 300 may include one or more operations, functions or actions as illustrated by one or more of operations 302 to 306 numbered evenly. By way of non-limiting example, process 300 may be described herein with reference to any of the example wake-on-voice devices, systems, or environments of FIGS. 1, 2, 10, 12, and 14-16, and where relevant.

Process 300 may include "receive audio data of human voice audio to be monitored to detect one or more waking keywords" 302, and particularly, an audio recording or live streaming data from one or more microphones for example. By one form, the audio data may be received from the perspective of a single computing device that may or may not be in the presence of other computing devices.

Process 300 may include "determine one or more environment indicators comprising using ultrasound to communicate among multiple ultrasound computing devices" 304. As explained in more detail herein, the environment may refer to the location and surroundings of the user of the audio device as well as the current activity of the user. The environment information also may be obtained from other sensors that indicate the location and activity of the user as described herein. Particularly, ultrasound signals may be transmitted and received at multiple ultrasound computing devices. Receipt of ultrasound signals with an unknown pattern or that carries a device ID may indicate an environment with multiple devices. The timing of the receipt also can be sued to determine which of multiple devices is closest to an audio source. By one form, this is performed by corresponding RMS levels to particular ultrasound transmission time slots. By one example, such closest device determination is decided only among devices within a pass-protected network. This may include receiving the RMS level, user ID, and/or device ID at, or from, a hub to form a proximity group, and/or between the devices in peer-to-peer communication, and all over a computer network.

In other instances, a broadcast code may transmitted and received that indicate multiple devices are in a same general location, such as a classroom or conference room, so that those devices deactivate their WoV responses and maintain a listen-only mode. In another instance, a security environment may transmit a pass-code from a first device, such as a laptop, to a second device, such as a smartphone, to then automatically receive the passcode back form the second device without user intervention and to authorize operation of WoV and other operations on the first device by the user of the second device, then assumed to be an authorized user of the first device. In addition, a device may receive its own reflected signal to determine if the device, such as a laptop, is being carried or stored in a container as the environment, and such as a laptop bag, briefcase, luggage, and so forth, such that the WoV should be deactivated.

Process 300 may include "waking one or more applications if the one or more waking keywords are detected in the audio and depending on the one or more environment indicators" 306. Also as explained in greater detail herein, when the environment indicator is favorable to WoV as described above when a WoV response is desired, the WoV response is permitted. When the environment indicator is not favorable to WoV such as when multiple devices are present or a device is not being used, then WoV responses are deactivated to keep a device silent.

Figure 4:
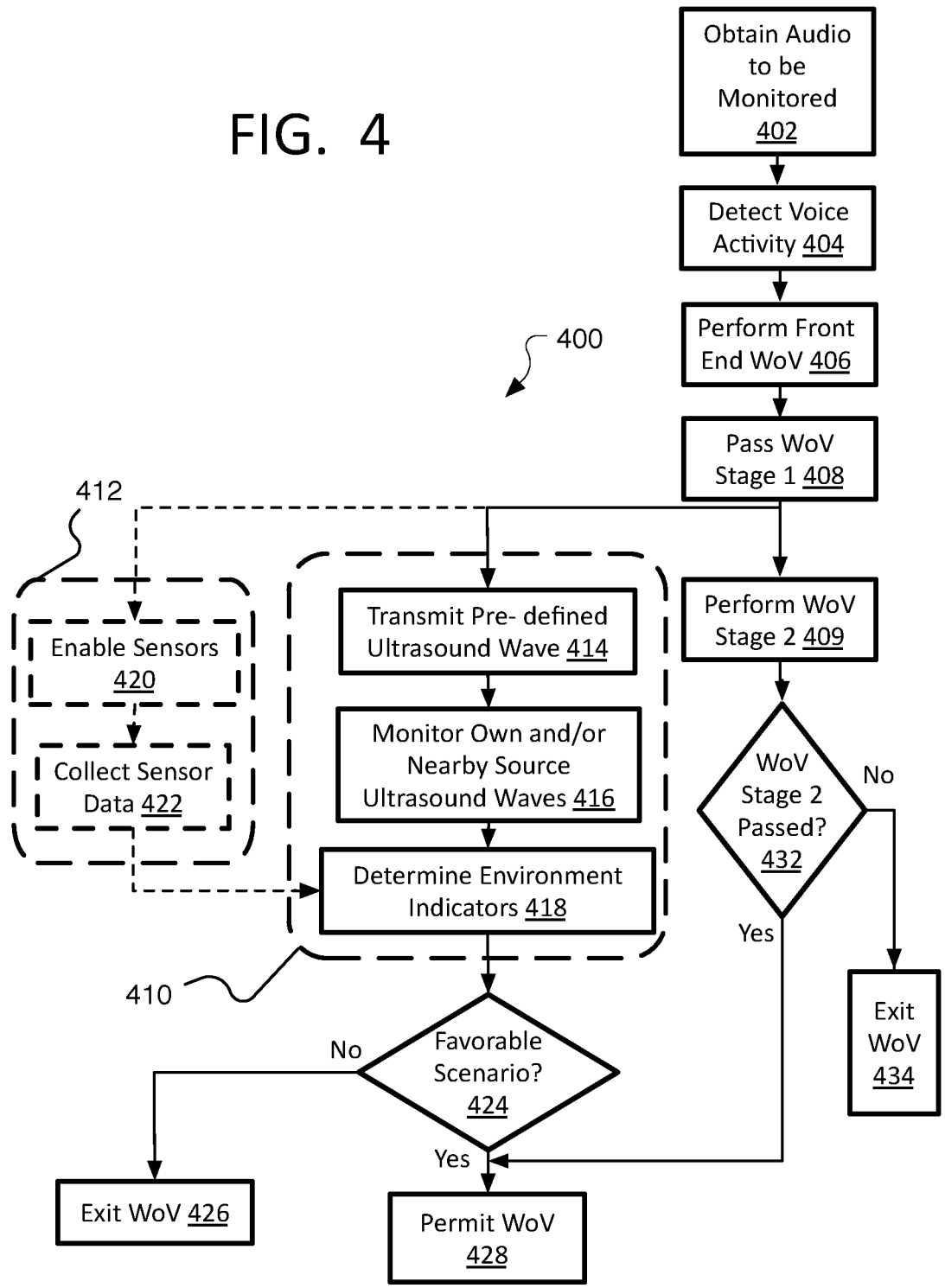
FIG. 4 is an example detailed flow chart of a method of environment-sensitive wake-on-voice initiation according to at least one of the implementations herein.

Referring to FIG. 4, an example process 400 is a computer-implemented method of environment-sensitive wake-on-voice initiation for a number of different ultrasound techniques that determine whether or not a device should audibly respond to an audio WoV request. In the illustrated implementation, process 400 may include one or more operations, functions or actions as illustrated by one or more of operations 402 to 434 generally numbered evenly. By way of non-limiting example, process 400 may be described herein with reference to any of the example wake-on-voice devices, systems, or environments of FIGS. 1, 2, 10, 12, and 14-16, and where relevant.

Process 400 may include "obtain audio to be monitored" 402. This may include reading audio input from acoustic signals captured by one or more microphones. The audio may be previously recorded or may be a live stream of audio data. This operation may include cleaned or pre-processed audio data, by de-noising and so forth, that is ready for ultrasound WoV operations.

Process 400 may include "detect voice activity" 404, and this refers to determining if a human voice is present in the audio and activates WoV detection operations.

Process 400 may include "perform front end WoV" 406, and this generally refers to the next operations in the WoV pipeline and including dividing the audio signal into frames to generating acoustic scores in a format that can be used by a WoV decoder.

Process 400 may include "Pass WoV Stage 1" 408. Here, a WoV decoder may use a customized or fixed-function neural network of audio accelerator hardware that provides a keyword score and then an initial keyword decision by hardware DSP(s) for example. The hardware may have a significantly minimized footprint compared to the hardware for large vocabulary ASR for example, in order to maintain low power usage. Once a keyword score is generated that passes some minimum threshold, ultrasound WoV operations may commence in parallel to WoV operations to further analyze the keyword scores and make a final WoV detection decision. This includes using ultrasound signals, and analysis of the ultrasound signals as well as other data, to determine the environment around the computing device and provide an environment indicator about the time the WoV decision unit decides whether or not a keyword is present at Stage 2 (409) using a DSP or CPU for example to analyze the keyword scores. This stage uses more power than the first stage and is reserved for when the keyword scores pass some final minimum threshold for example. When no keyword is present at the inquiry for passing 432 stage 2, the WoV operation is dropped or exited 434. It will be appreciated that when no keyword is confirmed in stage 2 by a device, the WoV process is dropped for that device and for any of the processes described herein, even though the environment detection of that device may have already determined the environment around one or more ultrasound computing devices and may have selected which device, including itself, should respond to the initial finding of keywords.

As to the environment indicator generation in parallel to the WoV detection operations 408, 409, 432, process 400 generally may have ultrasound environment detecting operations 410 and optionally additional other sensor environment detecting operations 412. Particularly, at least six environments, and in turn ultrasound techniques, are described herein including (A) detection of multiple ultrasound computing devices, (B) determination of a closest ultrasound computing device among multiple devices and relative to an audio source, (C) the detection of the closest ultrasound computing devices among devices on a same computer network or proximity group, (D) a same broadcast technique to silence WoV responses on multiple present ultrasound computing devices without a computer network membership, (E) a security authorization environment using a secondary ultrasound device, and (F) container detection of a container holding an ultrasound computing device when not being used. Any of these techniques may be assisted by other non-ultrasound sensors as well.

As to the ultrasound environment operations 410, this may include "transmit pre-defined ultrasound wave" 414, and this may refer to a number of different techniques described herein, and at different phases within those techniques to determine the environments (A) to (F). Techniques (A), (B), (C), and (D) all determine whether multiple devices are present by transmitting an ultrasound signal from the individual devices. The closest device detection techniques (B) and (C) also transmit additional ultrasound signals at certain timing, while the bag detection technique (F) use transmits an ultrasound signal to detect a container holding the ultrasound computing device.

The ultrasound environment operations 410 may include "monitor own and/or nearby source ultrasound waves" 416. This involves performing an ultrasound scan to receive ultrasound signals from other devices to confirm multiple devices are present for techniques (A), (B), (C), and (D). The closest device detection techniques (B) and (C) also receive additional ultrasound signals from other devices and at certain timing. Ultrasound additionally uses computer network transmissions to confirm membership of devices in a proximity group or private network. The same broadcast technique (D) also has devices receiving an ultrasound signal with an embedded broadcast code from a host to set the receiving devices on a silence mode. The security technique (E) receives an ultrasound signal with an embedded code from a secondary device to authorize access to the device receiving the code. The bag detection technique has the transmitting device set to detect its own reflected ultrasound signal.

The ultrasound environment operations 410 may include "determine environment indicators" 418. Thus, once the various ultrasound signals are transmitted and received, various operations may be performed either on the basis of the ultrasound signals alone to determine if multiple devices are present or to confirm a broadcast code has been received, or with analysis of the audio data itself, such as the RMS level of the audio from each device. The techniques also may use addition of other data from other transmissions such as computer network transmissions that may provide at least user or device ID data between a hub and the multiple devices, or among the multiple devices, when confirming proximity group or network membership before determining which device is closest to an audio source. This operation also may include the analysis of any of the techniques mentioned such as the security technique that authorizes access to a device with a pass code received from a secondary device, or a finding that a device is being held in a container.

By other forms, the sensor environment operations 412 may assist with determining an environment near the device and the environment indicator. In this case, the sensor environment operations 412 may include "enable sensors" 420 to activate them, and then "collect sensor data" 422. The sensor data then may be used by a sensor decision unit or the environment indicator unit itself to make conclusions as the environment such as the location of a user and/or whether a device is moving so that it is less likely that the WoV should be activated. The environment indicator may be a simple activate/deactivate setting.

Thus, process 400 may include the inquiry "favorable scenario?" 424, and when the indicator shows that the scenario or environment is not favorable to WoV and the device should remain quiet, process 400 may include "exit Wov" 426. When the environment is favorable to WoV, then process 400 may include "permit WoV" 428 that then permits the WoV control to awaken the device from a lower power mode to a higher power mode, awaken other applications such as a PA and ASR to recognize language in audio that comes after the keywords, and to respond to the keywords or following language. This may include asking for more information either after hearing "Hey [PA name]" and nothing else, or if the following language was misunderstood or too incomplete to form an answer. Otherwise, the response may provide requested information or may activate other applications to perform a task such as search for information on a web browser, open or close physical locks, perform computer tasks such as an open an onscreen window, and many other different tasks.

Figure 5:
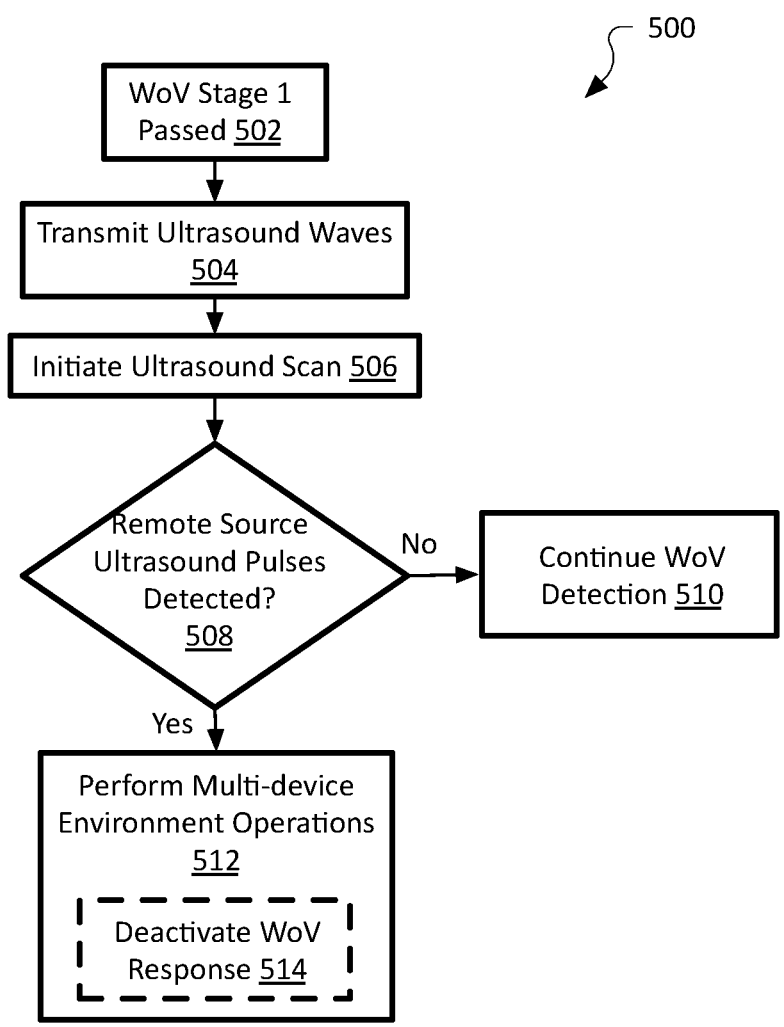
FIG. 5 is an example flow chart of a method of environment-sensitive wake-on-voice initiation that detects multiple ultrasound computing devices according to at least one of the implementations herein.

Referring to FIG. 5, an example process 500 is a computer-implemented method of environment-sensitive wake-on-voice initiation, and particularly, to determine whether or not it is likely that multiple devices heard the same audio WoV request. In the illustrated implementation, process 500 may include one or more operations, functions or actions as illustrated by one or more of operations 502 to 512 numbered evenly. By way of non-limiting example, process 500 may be described herein with reference to any of the example wake-on-voice devices, systems, or environments of FIGS. 1, 2, 10, 12, and 14-16, and where relevant.

Process 500 is directed to detecting whether multiple ultrasound computing devices, such as laptops or other devices, are within hearing range of each other. If so, it is assumed that a current device has detected multiple devices (or PCs) responding to the same WoV keyword(s). While voice biometrics may avoid this problem by identifying an authorized user for a particular device, voice biometrics can fail, be trained poorly, or may not be enabled. In this case, the multiple devices may have WoV activated to try to reply to the same keyword.

To avoid this disturbance, process 500 may include "WoV stage 1 passed" 502, as already described above with operation 408 (FIG. 4) to determine keyword scores and an initial positive keyword decision for received audio data to determine if the captured audio has something that might be a keyword.

Then, process 500 may include "transmit ultrasound waves" 504. Here, the ultrasound computing device, or multiple devices when present, individually transmit an ultrasound signal. By one form, the ultrasound signal or transmission is the form of a chirp modulation such as disclosed by Lazik, P., et al. "Indoor Pseudo-ranging of Mobile Devices using Ultrasonic Chirps-Carnegie Mellon University", Sensys 2012: Proceedings of the $10^{th}$ ACM Conference on Embedded Network Sensor Systems, pp. 99-112 (2012). A simple chirp signal has linear frequency modulated pulses. The advantage of the chirp signals is that a received chirp signal and an original chirp signal can be correlated through a filter to produce a narrow pulse even with a high signal-to-noise ratio (SNR). A single 20 ms chirp can be capable of carrying two-bit information. A pulse compression technique also can be used to provide good noise immunity in noisy scenarios such as a grocery store, home environment, open-plan office spaces, and so forth.

Process 500 may include "initiate ultrasound scan" 506, and to receive the ultrasound signals from other devices. The difficulty is that the device will receive reflection waves from its own output ultrasound signal as well. In order to differentiate the signals received from the devices and the current device's own reflected ultrasound signal, different wave patterns can be used for each of the devices. This may not always work, however, so that an alternative may be the use of a two-bit or more device ID embedded in the ultrasound signal that provides each device a different ID when possible. The size of the ID may be up to 4 to 8 bits and to provide unique IDs for 16 to 256 different devices. The size of the ID is not critical here since there are no hard time constraints on signal delivery. The device ID can be dynamically assigned to a device based on a user's voice keyword recording RMS level.

Process 500 may include the inquiry "remote source ultrasound pulses detected?" 508. The ultrasound signals then may be detected as captured audio through a device's one or more microphones, and analyzed to determine if it is an ultrasound signal by the signal's frequency range. If ultrasound, it is determined whether the signal has a device ID, signal pattern, or other identifier that is of another device rather than the device performing the analysis. Each device may have a listing or algorithm of known or possible device IDs or patterns. This may be repeated for each ultrasound computing device present. If such device ID or pattern is detected, then the environment identification unit concludes that multiple devices are present.

If no other device is detected, process 500 may include "continue WoV detection" 510, and the WoV unit remains activated for the audio being analyzed, and applications are awaken as described above. Otherwise, once multiple devices are detected, process 500 may include "perform multi-device environment operations" 512. This may include "deactivate WoV response" 514, and either at the WoV application, PA or responding application, or device volume, to avoid an undesired disruptive response. This also detects a multi-device environment in which passive voice biometric training can be shut down to avoid errors in the training since sounds from other users or devices could be captured.

Referring to FIG. 6, an example process 600 is a computer-implemented method of environment-sensitive wake-on-voice initiation, and particularly to determine which device is a closest device to an audio source and relative to the other devices. In the illustrated implementation, process 600 may include one or more operations, functions or actions as illustrated by one or more of operations 602 to 626 numbered evenly. By way of non-limiting example, process 600 may be described herein with reference to any of the example wake-on-voice devices, systems, or environments of FIGS. 1, 2, 10, 12, and 14-16, and where relevant.

Process 600 may include "WoV stage 1 passed" 602, and as already described above for process 400 and 500, to at least obtain a first threshold on a WoV pipeline that one or more keywords with a minimum score indicates the keyword of received audio data may be present in the captured audio.

Process 600 may include "compute keyword RMS level n" 604. To detect a relative position of a device, and in turn another user, in a multi-device environment using ultrasound, each ultrasound computing device uses a same predefined table that defines when the device should send an ultrasound wave, such as a pulse. The table is a list of successive time slots with a first time slot that starts as early as an initial first decision that a keyword exists by generation of a keyword score but at least before the WoV application is ready to inform the PA or other application to respond to the keyword. The initial decision may be generated by the existence of a minimum keyword score from hardware of WoV stage 1 as described above.

The table operates on the assumption that the closest device to a user as an audio source of the audio received at each of multiple devices will have the highest RMS level. Each time slot represents a different RMS level sequenced in chronological order with decreasing RMS levels of the audio signal of the recorded keyword. In a multi-device environment, each device (most likely) obtains a different time slot to transmit the ultrasound pulse. The higher the RMS level of the recorded keyword in the device, an earlier time slot will be allocated to the device so that the closest device to the audio source should have the first allocated time slot. This time slot mechanism maintains a minimal handshake between the devices to avoid any time delay, excess computational load, and excess power consumption.

The RMS level is the square root of the average of the square of the pressure of the sound signal over a given duration. The root-mean-square pressure is most often used to characterize a sound wave because it is directly related to the energy or intensity carried by the sound wave. To calculate the RMS pressure, there are typically four operations. First, the pressure of the sound is measured at points along the sound signal. The pressure is then squared each time it is measured. All of these measurements are averaged (added together and divided by the number of measurements). Finally, the square root of the average of the squared pressures is taken to give the rms pressure of the sound signal. By one form, the RMS level is computed as the pressure of overlapping audio segments of a duration.

Once the RMS level is obtained, process 600 may include "find corresponding time slot $T_n$," 606. The environment detection process may run parallel to the WoV pipeline after the first stage WOV and without delaying the overall WoV completion time compared to when the environment is not being detected. As soon as the WoV process detects that a keyword is not present, the system suspends the WoV process. The total WoV process time under a worst case scenario is approximately 900 ms, but most scenarios should be detected within 400 ms. This time is well within the overall system wake time from a ow power mode.

For calculating the worst-case time slot duration that should be used, sound pressure level (SPL) dynamic range is set at 12 dB, which is more than what is typically needed. The A4PC specification is followed and considers 70 dB for noisy scenarios and 63 dB for quiet scenarios. A time slot size is set as 1 dB which is sufficient to discriminate devices placed more than 1.5 m apart. A sample RMS-time slot Table 1 is shown below. The time slot is set at 80 ms to account for a 5 ms fade-in +20 ms chirp+5 ms fade out+50 ms gap. The 80 ms is sufficient for transmitting and receiving 20 ms pulse compression based chirp signals between the systems.

TABLE 1

Example Slot Distribution

| Slot Number (n) | SPL dB Min | SPL dB Max |
|---|---|---|
| Slot 1 | >72 | |
| Slot 2 | 70.0 | 72.0 |
| Slot 3 | 69.0 | 70.0 |
| Slot 4 | 68.0 | 69.0 |
| Slot 5 | 67.0 | 68.0 |
| Slot 6 | 66.0 | 67.0 |
| Slot 7 | 65.0 | 66.0 |
| Slot 8 | 64.0 | 65.0 |
| Slot 9 | 63.0 | 64.0 |
| Slot 10 | 62.0 | 63.0 |
| Slot 11 | 61.0 | 62.0 |
| Slot 12 | | <61 |

In operation, once the RMS level n is obtained, the system looks up the RMS level on the table and finds the corresponding time slot $T_n$. Here, n is a slot number that corresponds to a range of RMS level values, and by this example is 1 to 12. The transmission of the current device's own ultrasound signal is handled later below. First, or separately, the current device starts listening for other signals.

Thus, process 600 may include "initiate slot time counter $T_x$ ($T_x=T_1$)" 608. Here, a current time slot $T_x$ is open and now being the first time slot $T_1$ started as soon as the WoV pipeline indicates an initial decision that a keyword is present has been reached.

Process 600 may include "initiate ultrasound scan" 610 to receive the ultrasound time slot signals to determine if other devices had an earlier time slot than the current device.

Process 600 may include the inquiry "any remote ultrasound pulses detected?" 612. The environment detection systems are set to deactivate the WoV process including the environment detection process on each device if an ultrasound signal is received before the device has the chance to transmit its own ultrasound signal at its assigned time slot. Thus, if at time slot $T_1$, a signal is received, and the current device is not scheduled to send its ultrasound signal at time $T_1$, then process 600 may include "deactivate since not closest to system" 614. Hence, when a user utters the keyword, the device nearest to the user having recorded the maximum RMS level of keyword will be the first device to transmit the ultrasound pulse. In this case, the nearby devices, including the current device, receiving this ultrasound pulse will exit from their respective wake-on-voice flow including the environment detection process. Of course, it can be concluded that the environment indicator is that multiple devices exist and another device rather than the current device was closer to the audio source.

It will be understood that deactivating here refers to deactivating (or shutting down or suspending WoV action) is for the current audio received and being analyzed for keywords. The default is to restart the process each time new audio is received by a device or system. By other forms, the WoV process may be deactivated for a certain time period (such as one minute for example) or until a certain trigger is satisfied, such as a user moving.

Returning to the inquiry operation 614 and when no remote ultrasound signals are received at time slot $T_1$, process 600 may include the inquiry "is $T_x=T_n$," 618. This asks whether the current device is assigned the open time slot. If the current time slot is not the time slot of the current device yet, process 600 may include "increase $T_x=T_x+1$" 620. So now the time slot is incremented up one to $T_2$ in this running example. The current device listens for further ultrasound signals and loops back to inquiry operation 612 to repeat the process for the next time slot.

If the current time slot is the time slot of the current device, process 600 may include "transmit ultrasound" 622 in order to transmit the device's own ultrasound signal or pulse at the current device's assigned time slot.

Then, process 600 may include the inquiry "any remote ultrasound pulses detected?" 624. If not, process 600 may include "permit WoV as closest to system" 626. Thus, the current system is deemed closest to the audio source and its WoV process should remain activated to respond to the WoV keywords. Also, when an earlier ultrasound signal was received before the time slot of the current device, it can be concluded that the environment has multiple devices. Knowing that multiple devices are present in this case, the current device turns off its passive voice bio-metrics updating to avoid capture of erroneous training data.

Referring to FIG. 7A, the handshaking involved in this process is minimal. An example implementation 700 is shown where a device 1 701 and a device 2 711 are present and within listening distance from each other and both are in the presence of an audio source such as a person speaking keywords. Device 1 performs 702 WoV stage 1, determines 704 its corresponding time slot is time slot 2, scans for ultrasound signals and does not receive 706 a signal at time slot 1. At time slot 2, device 1 transmits 708 its own signal, determines it has transmitted its own signal first, and therefore continues 910 with the WoV process.

At the device 711, the operations 712, 714, and 716 are the same as operations 702, 704, and 706 except that device 2 is assigned time slot 3. Thus, device 2 receives the ultrasound signal from device 1 before device 2 has a chance to transmit its own ultrasound signal at time slot 3. In this case, device 2 deactivates or suspends the WoV process at device 2. In this case, the device 1 is closer to the audio source than device 2.

Returning to the inquiry 624 on process 600 (FIG. 6), and when multiple ultrasound signals are received within the same time slot, process 600 may include "report multi-PC wake error" 628 to report the multiple signals at the same time slot. The default of the WoV system in this case is to deactivate 614 the WoV process on the two or more devices that are both a same distance from the audio source in order to avoid annoyance or a disturbance.

Referring to FIG. 7B, a process 750 provides an example implementation of such a "tie" and default deactivation of the WoV process on those devices the same distance from the audio source at least measured within the same RMS level time slot. The handshaking for this scenario also is kept to a minimum.

Here, device 1 742, device 2, 744, and device 3 746 are shown each with generally the same operations as device 1 and device 2 from implementation 700 such that the general operations need not be described in detail again. Here, however, device 1 and device 2 are sufficiently the same distance from an audio source so that device 1 and device 2 have the same time slot assignment of time slot 2 (operation 752 and 762). Device 3 has time slot 3. In this case, when time slot 2 is open as the current time slot, both devices 1 and 2 transmit their ultrasound signals and both receive each other's ultrasound signal. Both device 1 and 2 will realize their own signal and the signal of the other device is at the same time slot 2 so that both device 1 and 2 will suspend 758 and 768 their WoV operations. Device 3 also receives ultrasound signals from both device 1 and device 2 before device 3 has a chance to transmit its own ultrasound signal at time slot 3. Thus, device 3 suspends its own WoV process as well.

Figure 8:
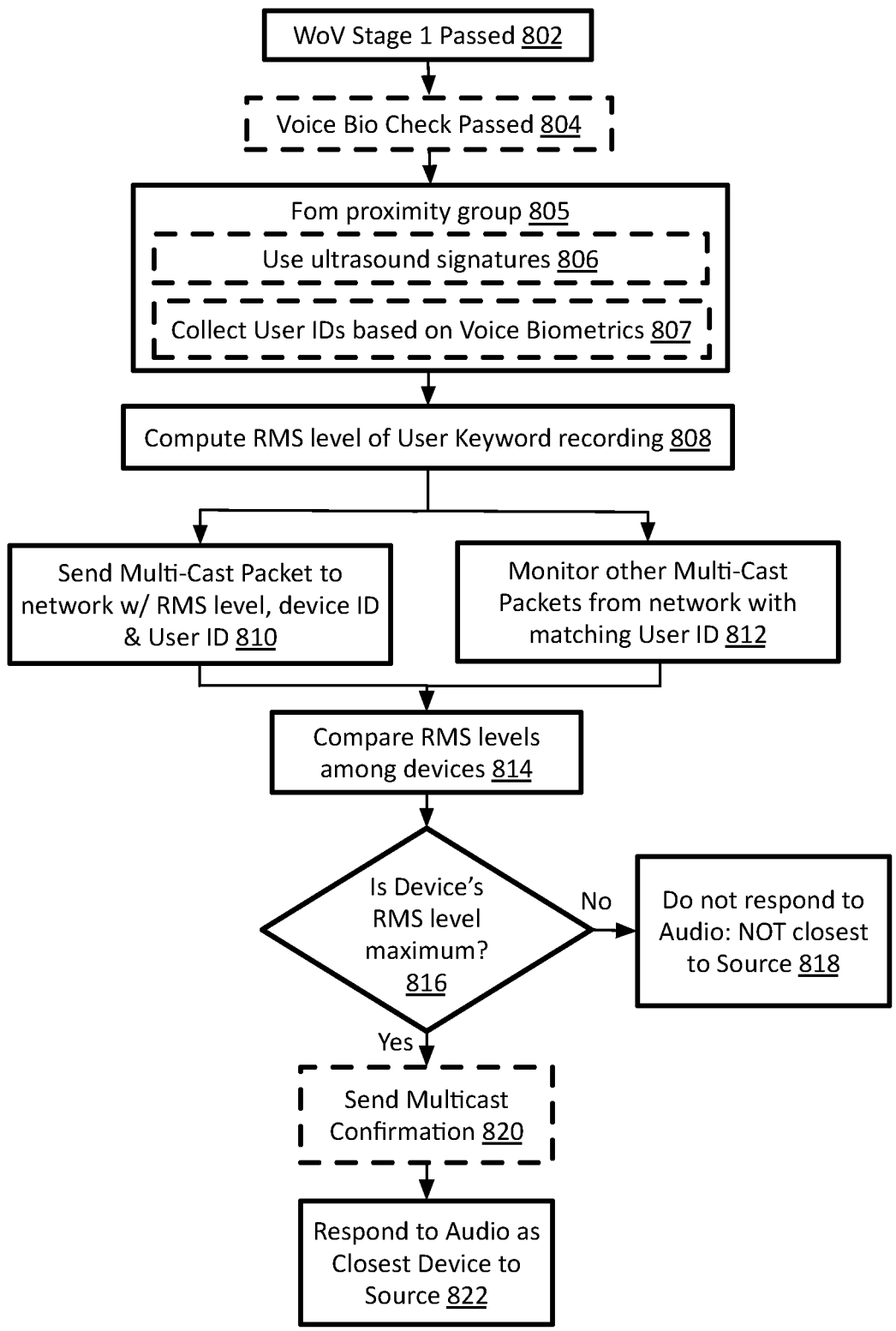
FIG. 8 is an example flow chart of a method of environment-sensitive wake-on-voice initiation that detects the closest ultrasound computing device to a source for computing devices on a network according to at least one of the implementations herein.

Referring to FIG. 8, the process 600 while efficient, still is not as fast as it could be due to delays in looking-up the time slots and waiting to transmit ultrasound signals at assigned time slots. The time slots can be avoided without added delay when the devices are on a same computer network. For example, a process 800 is an example computer-implemented method of environment-sensitive wake-on-voice initiation, and particularly, to determine which of multiple devices on a same computer network is closest to an audio source. In the illustrated implementation, process 800 may include one or more operations, functions or actions as illustrated by one or more of operations 802 to 822 generally numbered evenly. By way of non-limiting example, process 800 may be described herein with reference to any of the example wake-on-voice devices, systems, or environments of FIGS. 1, 2, 10, 12, and 14-16, and where relevant.

Similar to process 600, this technique uses the keyword recording RMS levels to determine the closest device to the audio source as well, except here the devices that are included in the environment detection process are first formed into a proximity group or computer network group. In this implementation, once a proximity group is formed, then the keyword RMS values are exchanged among the devices in the proximity group to quickly determine the device that is closest to the audio source and should respond to the received audio.

Process 800 may include "WoV stage 1 passed" 802, and this is as described above with processes 400, 500, and 600 to determine keyword scores and an initial keyword decision for received audio data.

By one option, process 800 may include "voice bio check passed" 804. For this option, voice biometrics, or speaker recognition, is used as one of the identifiers to determine membership in the proximity group. In this case, if a user has passed the voice bio check for the user's device, the user's device can be a candidate for membership in the proximity group.

Process 800 may include "form proximity group" 805. This may include "use ultrasound signatures" 806. In this case, a hub at a remote device, typically at, or connected to, a display device or audio loudspeaker device in a conference room, may transmit an unique ultrasound signature to the multiple devices as a pass code to join a proximity group. By one form, the hub transmits a pin in the form of an ultrasound signature embedded in an ultrasound signal to the multiple devices. By another form, the ultrasounds signature is transmitted to the multiple devices via a computer network, such as the internet, some other WAN, or some other private LAN. The devices can transmit the pin back to the hub via ultrasound signal to be listed as a member device in the proximity group. Many different hub configurations and products may be used as the hub as long as it has computer network connectivity, and speakers and microphones compatible with ultrasound transmissions and reception as described herein. Based on this unique signature, the devices can form a proximity group with each device's IP address being used as a device ID.

In the alternative, in outdoor open space where no existing ultrasound signature is present, the multiple devices may emit their own ultrasound signatures or rely on paired Bluetooth to discover nearby devices to form a proximity group. Again, each proximity group member keeps a list of IP addresses of each of the members of the proximity group as the device IDs.

Also, confirming membership in the proximity group may be at least partly based on the user IDs. In this case, process 800 may include "collect user IDs based on voice biometrics" 807, and this may include obtaining validation based on voice biometrics previously obtained by the system 6. The user IDs from the other devices are then transmitted to each device, via computer network or ultrasound signal, and either from the hub or from each of the multiple devices.

Once, or as, the proximity group is formed, process 800 may include "compute RMS level of user keyword recording" 808. As described previously for process 600, each ultrasound computing device that receives and initially detects the keyword may compute the RMS level of the keyword audio data of the received audio.

Process 800 may include "send multi-cast packet to network with RMS level, device ID, and user ID" 810. Now, the RMS level computed at each device member of the proximity groups transmits the RMS level and either the device ID, user ID or both types of IDs, and transmitted to the hub and the other devices in the proximity group. The devices may be in "always listening" modes to receive the proximity multi-cast packets. The RMS level of the recordings are tied with user IDs and/or device IDs to more easily differentiate packets with the RMS levels from other packets not relevant to the proximity group and/or not relevant to the closest device detection. Thus, a receiving device can filter out packets that are not relevant to identify other devices in the proximity group much more quickly.

Process 800 may include "monitor other multi-cast packets from network with matching user ID" 812, and this simply refers to each ultrasound computing device both transmitting its own data while listening for the RMS levels of the other devices in the proximity group.

Process 800 may include "compare RMS levels among devices" 814. Where the RMS levels are all compared to each other to determine which device has the highest RMS level. Thus, after a preset time interval (10 to 100 milliseconds for example) from the first transmission of the multi-cast IP packet, each device will determine its ranking of distance to user based on the RMS values.

Process 800 next may include the inquiry "is device's RMS level maximum?" 816. Here, the device determines if it has the maximum RMS level, and if not, process 800 may include the inquiry "do not respond to audio: not closest to source" 818. In this case, the WoV application is deactivated for this received audio.

Optionally, process 800 may include "send multicast confirmation" 820. Here, the device with the highest RMS value may send a multicast message, either by ultrasound or computer network, to the proximity group and either through the hub or directly to the member devices, to confirm that it will respond to the audio with the keyword(s).

Otherwise, process 800 may include "respond to audio as closest device to source" 822, where the WoV application remains activated and informs the PA or other application to respond to the keywords found in the audio as described elsewhere herein.

Figure 9:
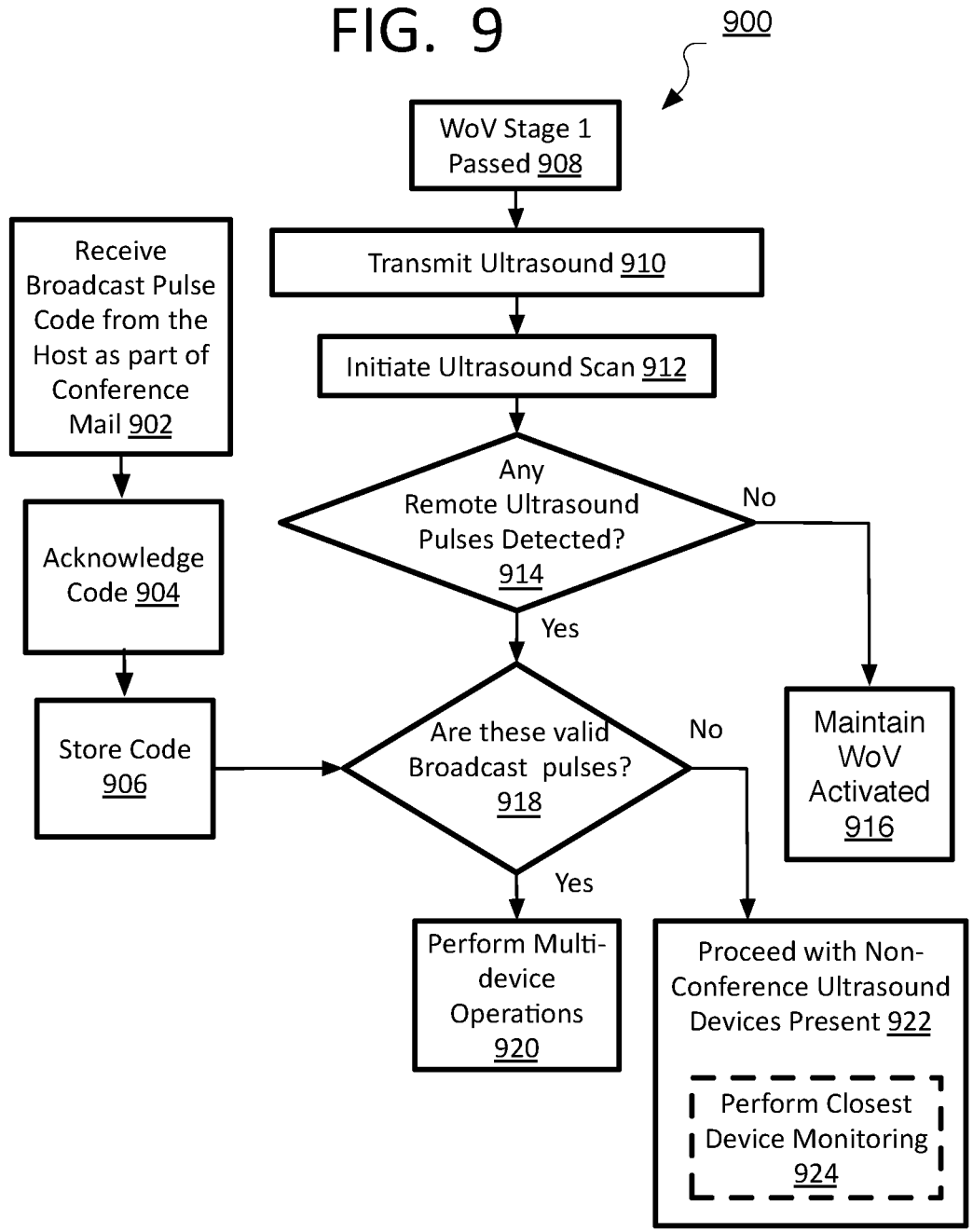
FIG. 9 is an example flow chart of a method of environment-sensitive wake-on-voice initiation that silences an ultrasound computing device in a group environment according to at least one of the implementations herein.

Referring to FIG. 9, an example process 900 is a computer-implemented method of environment-sensitive wake-on-voice initiation, and particularly, to silence multiple devices in a same vicinity such as a conference room or classroom. In the illustrated implementation, process 900 may include one or more operations, functions or actions as illustrated by one or more of operations 902 to 924 numbered evenly. By way of non-limiting example, process 900 may be described herein with reference to any of the example wake-on-voice devices, systems, or environments of FIGS. 1, 2, 10, 12, and 14-16, and where relevant.

Process 900 may include "receive broadcast pulse code from the host as part of conference mail" 902. For this technique, one or more devices may receive a broadcast pass code or presence code embedded in an ultrasound signal. For broadcast codes that need not be secure, the broadcast code can be an ultrasound chirp as explained above. This permits each system or device to declare its presence, when needed, in a conference room for example, by transmitting the presence code back to the host via ultrasound. Otherwise, the presence code may be used as an environment indicator to indicate a device is in a conference or classroom room, and the audible response mode of the WoV should be deactivated. A tone system can be used that has the following metrics:

TABLE 2

Presence Detection Performance Metrics

| Names | Metrics |
| --- | --- |
| Range | >7 meters |
| Accuracy | >99% |
| False Positive | 0% (0/36000+) |
| Audible noise (out of band, <18 KHz) | <hearing threshold at 10 cm |

So in operation, once the presence code is received at an ultrasound computing device, process 900 may include "acknowledge code" 904, where each device receiving the code in the conference room or other location within listening distance of the audio may transmit the code or other confirmation back to the host. By one form, however, the confirmation may be omitted, and the devices may act upon receiving the code without any confirmation transmission back to the host.

Next, process 900 may include "store code" 906, where the presence code is stored on the device for future use.

Separately, process 900 may begin operations to determine whether or not multiple devices are present within listening distance of each other and an audio source. Thus, process 900 may include operations 908 to 916 that are the same as operation 502 to 510 in process 500 to determine whether or not other devices are present. If not, the WoV detection and responses remain activated.

Otherwise, when remote source ultrasound pulses (or any such waves) are detected, process 900 may include the inquiry "are these valid broadcast pulses?" 918, where the ultrasound signal transmitted by the devices will have the broadcast presence code embedded in the ultrasound signal. This may be a 2-bit code but could be larger. In this case, an environment detection unit for example may compare the stored code to the code extracted from the ultrasound signal from other devices.

When the codes match, process 900 may include "perform multi-device operations" 920. This may include having all of the attendee devices monitor a meeting, conference, or classroom through its microphones and deactivate their WoV audible responses to keywords spoken by a leader in the meeting or anyone else during the meeting. By one example form, once the host utters the keyword, then the host device will send the meeting broadcast code or pin via the ultrasound pulse to the various attendee devices. This deactivation may be set for each separate audio sequence received, for a certain time period (such as a meeting duration), or when other criteria is met.

When it is found that the ultrasound signals are not valid broadcast code or pin signals, process 900 may include "proceed with non-conference ultrasound devices present" 922. In this case, the WoV applications of the attendee devices may remain on but may "perform closest device monitoring" 924 such as with process 600 or 800, or may perform other strategies appropriate strategies when multiple devices are present.

Figure 10:
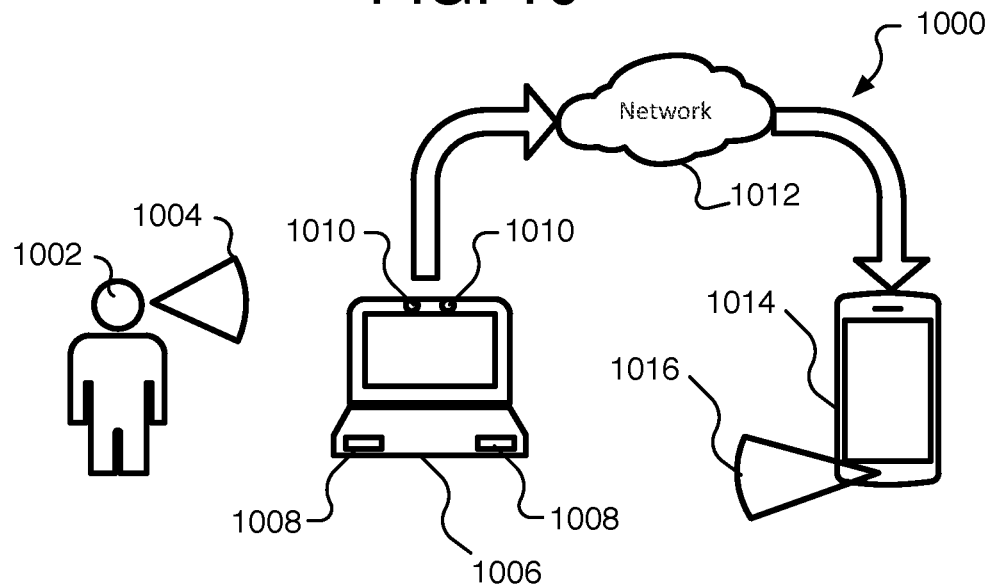
FIG. 10 is a schematic diagram of a security environment in which a method of environment-sensitive wake-on-voice initiation may be performed according to at least one of the implementations herein.

Referring to FIG. 10, a security environment 1000 is shown where a user 1002 speaks keywords 1004 producing audio or acoustic waves. A first device 1006, such as a laptop but could be many different computing devices, may have microphones 1010 to receive and analyze the audio, and speakers 1008 to audibly respond to the keywords and other speech. The microphones are able to receive and analyze ultrasound signals or waves (or pulses). A computer or communications network 1012 receives computer network messages or transmissions from the device 1006 to provide the messages to a secondary device 1014, here shown as a smart phone. The secondary device 1014 has the ability to send ultrasound signals, and may embed data of two-bits or more in the ultrasound signals.

Figure 11:
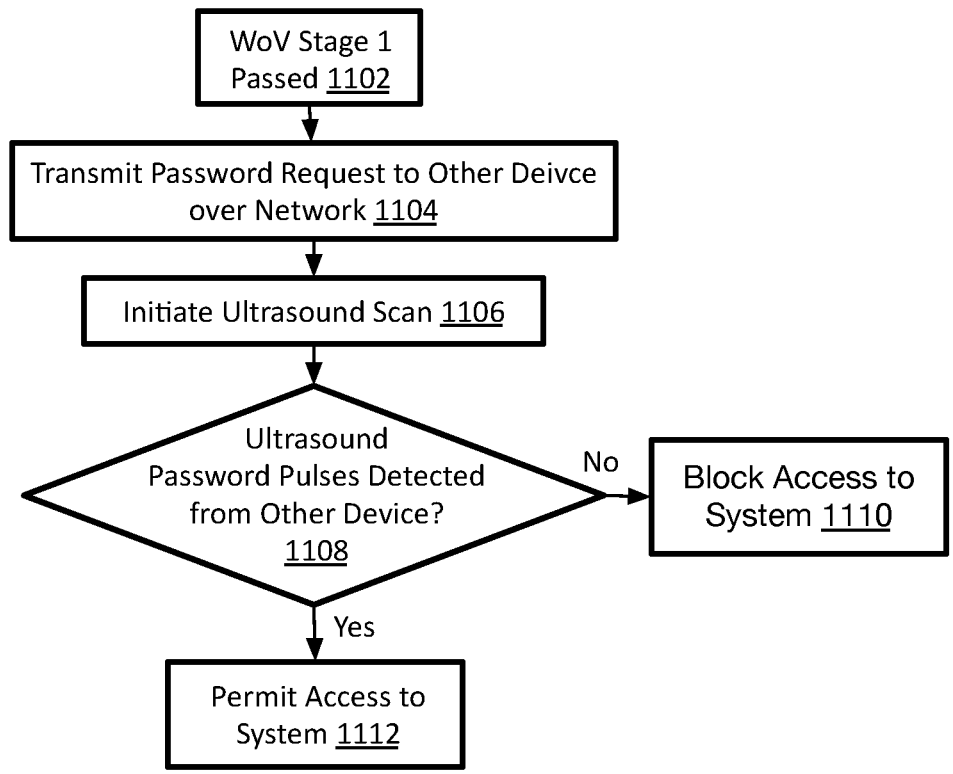
FIG. 11 is an example flow chart of a method of environment-sensitive wake-on-voice initiation that uses a secondary authorization device for security according to at least one of the implementations herein.

Referring to FIG. 11, an example process 1100 may use the security environment 1000, and is a computer-implemented method of environment-sensitive wake-on-voice initiation, and particularly, to provide a security method. In the illustrated implementation, process 1100 may include one or more operations, functions or actions as illustrated by one or more of operations 1102 to 1112 numbered evenly. By way of non-limiting example, process 400 may be described herein with reference to any of the example wake-on-voice devices, systems, or environments of FIGS. 1, 2, 10, 12, and 14-16, and where relevant.

Process 1100 may include "WoV stage 1 passed" 1102, and as described above where an initial positive determination is made that a keyword probably exists in the received audio.

Process 1100 then may include "transmit password request to other device over network" 1104. In detail, to detect if an environment is secure, a first device can use an external second device for authentication when the second device is nearby, such as a user's smart phone by one example. Thus, the second device can act as presence detection on behalf of the user. In other words, it is assumed a same user has two devices such as a laptop and smartphone. Then, when the second device is near the first device, at least close enough to transmit with an ultrasound signal, it can be relatively safely assumed that the user is also near the first device and it is safe to permit access to the first device, and here particularly to permit a WoV system on the first device to respond to received audio.

So in operation, once the wake word is at least initially recognized by the first stage, the first device can send a password request notification (or pass code) to an external second device through a computer network such as the internet, other WAN, or a LAN. The external second device, once receiving the request, may send the password embedded in an ultrasound signal by emitting through the speakers on the second device.

Accordingly, process 1100 may have the first device "initiate ultrasound scan" 1106. The first device, during its ultrasound scan, can monitor for the ultrasound carrying the password from the second device.

Process 1100 may include the inquiry "ultrasound password pulses detected from other device?" 1108, and if not, access is blocked 1110 to the first device. If the ultrasound signal carrying the password is received and matches the password sent, the first device verifies the ultrasound password and determines that the environment is secure. Process 1100 then may include "permit access to system" 1112, and permits access to the first device including the WoV system on the first device. This ensures that the PC responds only when the user's phone is nearby (in the line of sight or listening distance or ultrasound signals for example).

Figure 12:
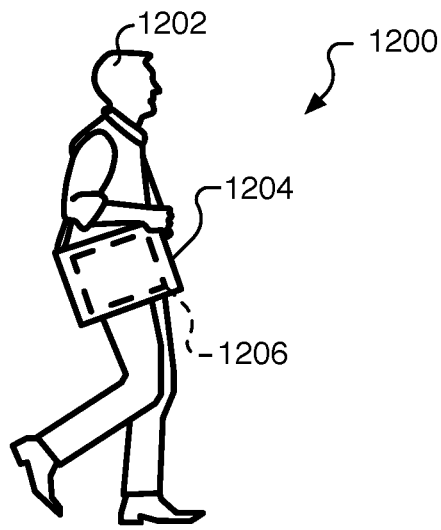
FIG. 12 is an example schematic diagram of a computing device container environment in which a method of environment-sensitive wake-on-voice initiation may be performed according to at least one of the implementations herein.

Referring to FIG. 12, an environment 1200 has a ultrasound computing device 1206 being held in a container 1204. In this case, a person or user 1202 is carrying, and therefore moving, the container, here a shoulder laptop bag, and in turn the ultrasound computing device 1206, which may be a laptop. In this environment, it is unlikely that the user desires the WoV system on the device 1206 to audibly respond to keywords when the device 1206 is covered in this way. This is especially true since it is so inconvenient to remove the device from the bag 1204 to perform many different actions when an audible WoV response is emitted from the device. For example, a user may need to move the device's microphones or speakers closer to the user's ears or mouth for better communication with the PA on the device, or to use the keyboard or other interface on the device 1206 when it is needed to properly respond to the audio of the PA on the device. Thus, it is often more desirable to have the WoV deactivated when the device 1206 is enclosed in the bag 1206. It also will be understood that the container or bag may be many different types of containers made of many different types of materials, such as luggage, briefcase, backpack, flexible bag, dolly computer case, boxes, laptop or computer shipment padding covers, smartphone covers (when moved over the speakers for example), safes, crates, cases, and so forth, and whether made of plastic, metal, paper, cloth or fabric, or any other material, and any combination of any of these.

Figure 13:
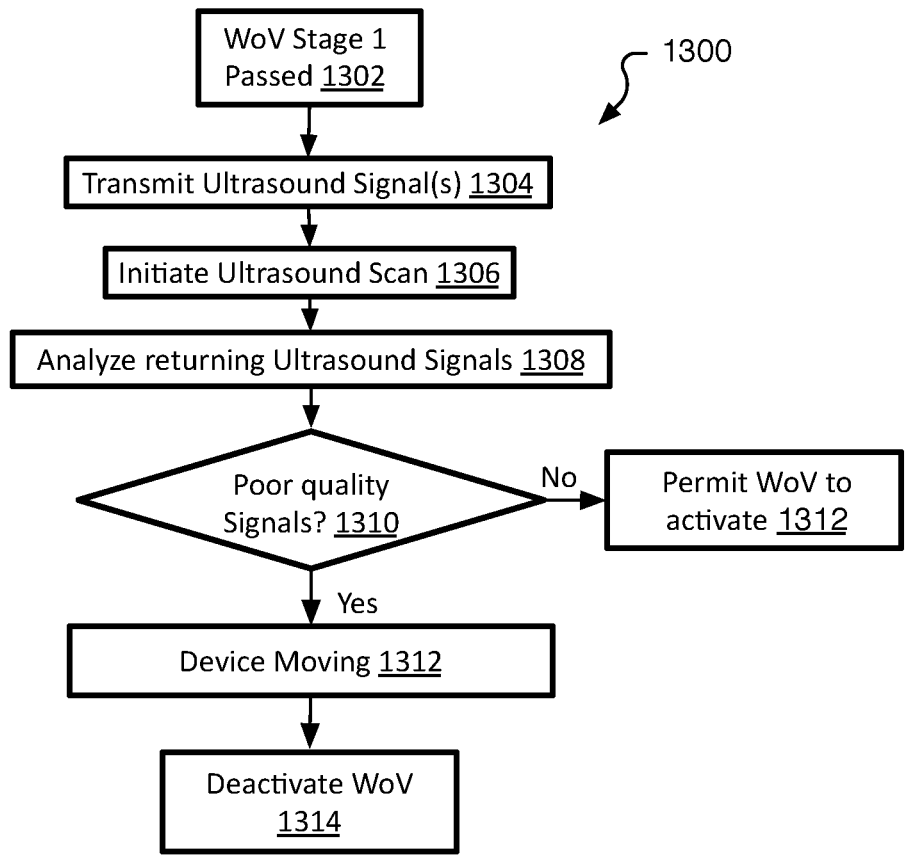
FIG. 13 is an example flow chart of a method of environment-sensitive wake-on-voice initiation to detect a computing device container environment according to at least one of the implementations herein.

Referring to FIG. 13, an example process 1300 in the environment 1200 is a computer-implemented method of environment-sensitive wake-on-voice initiation, and particular, for security of an ultrasound computing device. In the illustrated implementation, process 1300 may include one or more operations, functions, or actions as illustrated by one or more of operations 1302 to 1314 numbered evenly. By way of non-limiting example, process 1300 may be described herein with reference to any of the example wake-on-voice devices, systems, or environments of FIGS. 1, 2, 10, 12, and 14-16, and where relevant.

Process 1300 may include "work stage 1 passed" 1302, and as described above where initial decisions indicate one or more keywords are present in received audio.

Process 1300 may include "transmit ultrasound signal(s)" 1304, where the device transmits ultrasound signals through its speakers and in predetermined formats and parameters, whether in pulses or otherwise, and controlled amplitude, wavelength, and so forth so that reflections of the transmitted signals back to the device are in expected patterns.

Process 1300 may include "initiate ultrasound scan" 1306, where the device listens for its own ultrasound signals reflected back to its microphones.

Process 1300 may include "analyze returning ultrasound signals" 1308, and determine if the signals have patterns that match pre-stored patterns of containers at very close distances, or adjacent, the device. Thus, when a device is held in a container as in environment 1200, ultrasound signals from the device are reflected back to the microphones of the device, and the signals should be attenuated and have certain detectable patterns due to the bag inner walls at least partially blocking the speaker and the microphone ports from open a larger volume of open space. These patterns can be tested for and stored in memory such as for containers of laptop bags or other containers, and of a variety of materials, as described above with environment 1200. Thus, when one of the reflected ultrasound signals generally or specifically matches, or is deemed sufficiently close to, a pre-stored container pattern, then it is concluded that the signal is of poor quality and therefore indicates the device is being stored or carried in a container.

Process 1300 may include inquiry "poor quality signals?" 1310, and if the conclusion is that the signal does not match a pre-stored pattern, then it is (or is more likely to be) of good quality, and process 1300 may include "permit WoV to activate" 1312, where the WoV application can continue as usual.

Otherwise, when the ultrasound signal is deemed of poor quality for the reasons mentioned, process 1300 may include "deactivate WoV" 1314, where the audible response to keywords is deactivated. The deactivation may continue until the environment detection unit detects that the device is no longer covered by a container, a time duration, or other criteria.

It also is mentioned above that sensors on the device may detect whether a device is moving. Since a user is less likely to desire WoV responses to keywords from a device such as a laptop when it is moving, this can aid in determining when to deactivate the WoV keyword responses. In this case, once a WoV stage 1 is passed in any of the processes mentioned above, the device may enable sensors (such as an accelerometer and gyro) to inform the environment detection unit that the device is most likely moving so that this can be factored into the decision to deactivate the WoV audible responses to keywords. This can also be the only determination for deactivating the WoV audible responses if it is desired.

It will be appreciated that processes 300, 400, 500, 600, 700, 740, 800, 900, 1100, and/or 1300 may be provided by sample WoV devices, systems, or environments 100, 200, 1000, 1200, and/or 1400 to operate at least some implementations of the present disclosure. It will be appreciated that one or more operations of any of these processes may be omitted or performed in a different order than that recited herein.

In addition, any one or more of the operations of FIGS. 3-9, 11, and 13 may be undertaken in response to instructions provided by one or more computer program products. Such program products may include signal bearing media providing instructions that, when executed by, for example, a processor, may provide the functionality described herein.

The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 14:
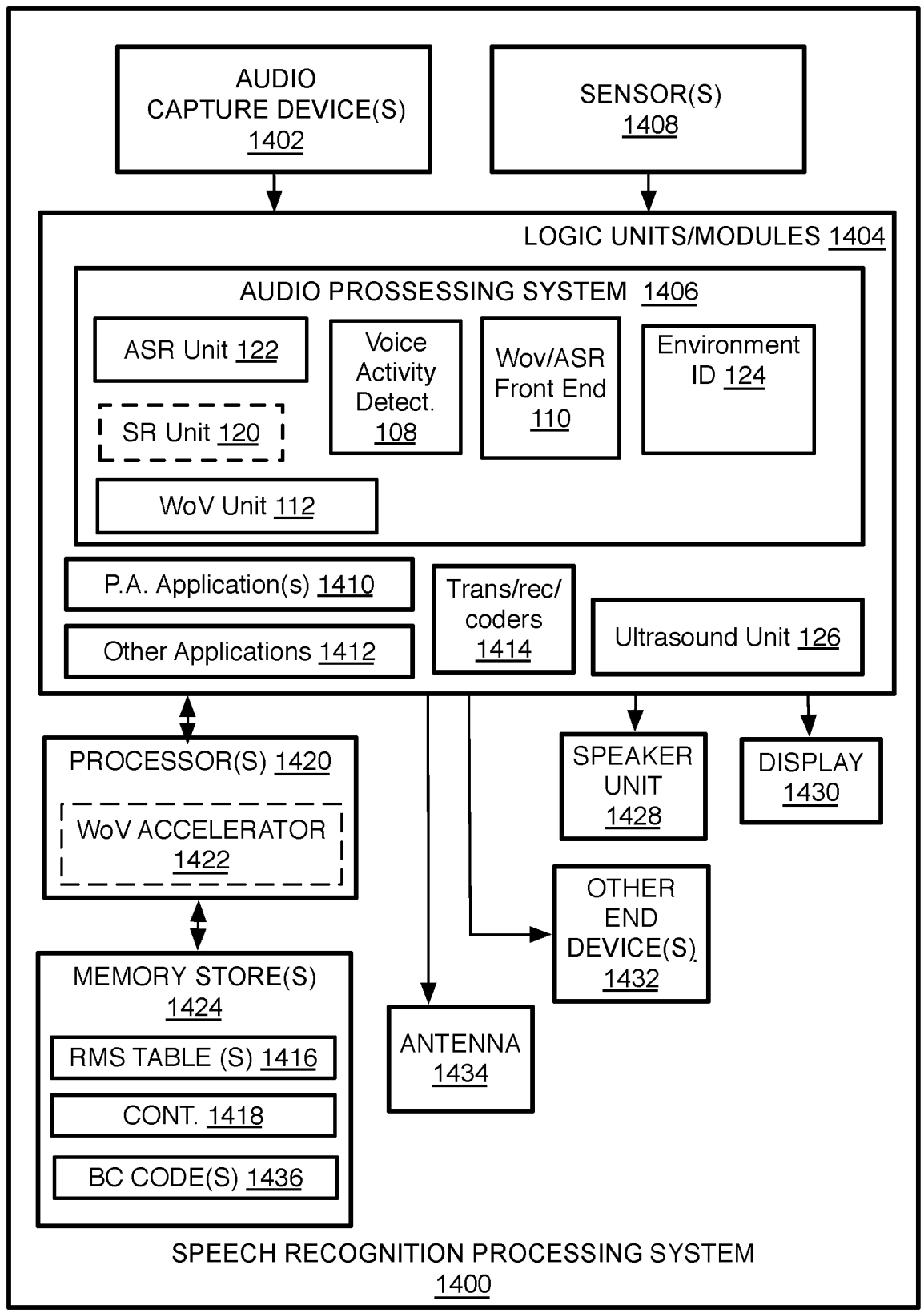
FIG. 14 is an illustrative diagram of an example system.

Referring to FIG. 14, an example speech recognition processing system 1400 is arranged in accordance with at least some implementations of the present disclosure. In various implementations, the example speech recognition processing system 1400 may have an audio capture device(s) 1402 to form or receive acoustical signal data. This can be implemented in various ways. Thus, in one form, the speech recognition processing system 1400 may be an audio capture device such as a microphone, and audio capture device 1402, in this case, may be the microphone hardware and sensor software, module, or component. In other examples, speech recognition processing system 1400 may have an audio capture device 1402 that includes or may be a microphone, and logic modules 1404 may communicate remotely with, or otherwise may be communicatively coupled to, the audio capture device 1402 for further processing of the acoustic data.

In either case, such technology may include a wearable device such as smartphone, wrist computer such as a smart-watch or an exercise wrist-band, or smart glasses, but otherwise a telephone, a dictation machine, other sound recording machine, a mobile device or an on-board device, or any combination of these. The speech recognition system used herein enables ASR for the ecosystem on small-scale CPUs (wearables, smartphones) since the present environment-sensitive systems and methods do not necessarily require connecting to the cloud to perform the ASR as described herein.

Thus, in one form, audio capture device 1402 may include audio capture hardware including one or more sensors as well as actuator controls. These controls may be part of an audio signal sensor module or component for operating the audio signal sensor. The audio signal sensor component may be part of the audio capture device 1402, or may be part of the logical modules 1404 or both. Such audio signal sensor component can be used to convert sound waves into an electrical acoustic signal. The audio capture device 1402 also may have an A/D converter, other filters, and so forth to provide a digital signal for speech recognition processing.

The system 1400 also may have, or may be communicatively coupled to, one or more other sensors or sensor subsystems 1408 that may be used to provide information about the environment in which the audio data was or is captured. Specifically, a sensor or sensors 1408 may include any sensor that that may indicate information about the environment in which the audio signal or audio data was captured including a global positioning system (GPS) or similar sensor, thermometer, accelerometer, gyroscope, barometer, magnetometer, galvanic skin response (GSR) sensor, facial proximity sensor, motion sensor, photo diode (light detector), ultrasonic reverberation sensor, electronic heart rate or pulse sensors, any of these or other technologies that form a pedometer, other health related sensors, and so forth.

In the illustrated example, the logic modules 1404 may include the audio processing unit 1406 with a voice activity detection unit 108, a WoV/ASR front end unit 110 that provides pre-processing, a WoV unit 112, an SR unit 120, an ASR unit 122, and an environment identification unit 124 all as described above with system 100 (FIG. 1). The decoder unit 1414 may be operated by, or even entirely or partially located at, processor(s) 1420, and which may include, or connect to, one or more WoV accelerators 1422 as well as other accelerators to perform at least keyword score generation. The logic modules 1404 also may have the ultrasound unit 126 as described above, one or more P.A. application(s) unit 1410, other applications that can be used to perform WoV responses, transmitter/receiver and/or coders 1414 to transmit audio or other data over a wired or wireless computer network. The logic modules 1404 may be communicatively coupled to the components of the audio capture device 1402 and sensors 1408 in order to receive raw acoustic data and sensor data. The logic modules 1404 may or may not be considered to be part of the audio capture device 1402.

The speech recognition processing system 1400 may have one or more processors 1420 which may include the accelerator 1422, which may be a dedicated accelerator, and the at least one processor may be one such as the Intel Atom. Memory stores 1424 may or may not hold an RMS table 1416, container patterns 1418, and broadcast codes 1436 to name a few examples, and as well as phoneme, vocabulary, and/or context databases, and so forth. At least one speaker unit 1428 provides auditory responses to the input audio and emits ultrasound waves or pulses. One or more displays 1430 provide images or other content as a visual response to the acoustic signals, while other end device(s) 1432 may perform actions in response to the acoustic signal. An antenna 1434 is provided for wireless transmissions as well. In one example implementation, the speech recognition system 1400 may have the display 1430, at least one processor 1420 communicatively coupled to the display, at least one memory 1424 communicatively coupled to the processor. As illustrated, any of these components may be capable of communication with one another and/or communication with portions of logic modules 1404 and/or audio capture device 1402. Thus, processors 1420 may be communicatively coupled to both the audio capture device 1402, sensors 1438, and the logic modules 1404 for operating those components. By one approach, although speech recognition system 1400, as shown in FIG. 14, may include one particular set of blocks or actions associated with particular components or modules, these blocks or actions may be associated with different components or modules than the particular component or module illustrated here.

As another alternative, it will be understood that speech recognition system 1400, or the other systems described herein (such as system 1500), may have or use a server, or may be part of a server-based system or network rather than a mobile system. Thus, system 1400, in the form of a server, may not have, or may not be directly connected to, the mobile elements such as the antenna, but may still have the same components of the audio processing system 1406 and provide speech recognition services over a computer or telecommunications network for example. Likewise, platform 1502 of system 1500 may use a server platform for some tasks instead. Using the disclosed speech recognition unit on server platforms for at least some ASR tasks will save energy and provide better performance.

Figure 15:
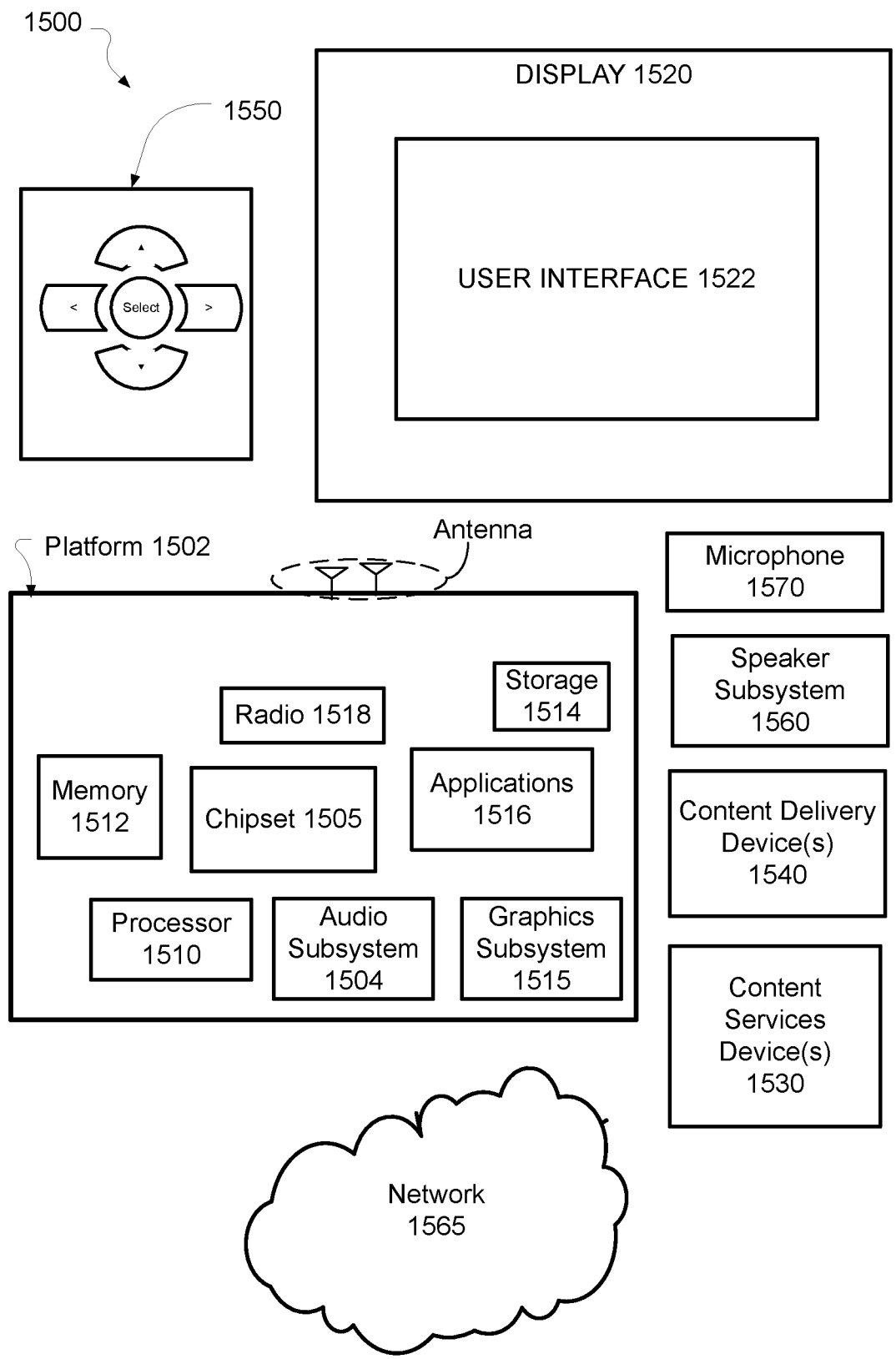
FIG. 15 is an illustrative diagram of another example system.

Referring to FIG. 15, an example system 1500 in accordance with the present disclosure operates one or more aspects of the speech recognition system described herein. It will be understood from the nature of the system components described below that such components may be associated with, or used to operate, certain part or parts of the speech recognition system described above. In various implementations, system 1500 may be a media system although system 1500 is not limited to this context. For example, system 1500 may be incorporated into a wearable device such as a smart watch, smart glasses, or exercise wrist-band, microphone, personal computer (PC), laptop computer, ultra-laptop computer, tablet, touch pad, portable computer, handheld computer, palmtop computer, personal digital assistant (PDA), cellular telephone, combination cellular telephone/PDA, television, other smart device (e.g., smartphone, smart tablet or smart television), mobile internet device (MID), messaging device, data communication device, and so forth.

In various implementations, system 1500 includes a platform 1502 coupled to a display 1520. Platform 1502 may receive content from a content device such as content services device(s) 1530 or content delivery device(s) 1540 or other similar content sources. A navigation controller 1550 including one or more navigation features may be used to interact with, for example, platform 1502, at least one speaker or speaker subsystem 1560, at least one microphone 1570, and/or display 1520. Each of these components is described in greater detail below.

In various implementations, platform 1502 may include any combination of a chipset 1505, processor 1510, memory 1512, storage 1514, audio subsystem 1504, graphics subsystem 1515, applications 1516 and/or radio 1518. Chipset 1505 may provide intercommunication among processor 1510, memory 1512, storage 1514, audio subsystem 1504, graphics subsystem 1515, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device, or any other available storage. In various implementations, storage 1514 may include technology to increase the storage performance enhanced protection for valuable digital media when multiple hard drives are included, for example.

Audio subsystem 1504 may perform processing of audio such as environment-sensitive automatic speech recognition as described herein and/or voice recognition and other audio-related tasks. The audio subsystem 1504 may comprise one or more processing units and accelerators, such as fixed-function neural network accelerators. Such an audio subsystem may be integrated into processor 1510 or chipset 1505. In some implementations, the audio subsystem 1504 may be a stand-alone card communicatively coupled to chipset 1505. An interface may be used to communicatively couple the audio subsystem 1504 to at least one speaker 1560, at least one microphone 1570, and/or display 1520.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, Display Port, wireless HDMI, and/or wireless HD compliant techniques. Graphics subsystem 1515 may be integrated into processor 1510 or chipset 1505. In some implementations, graphics subsystem 1515 may be a stand-alone card communicatively coupled to chipset 1505.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520, speaker 1560, and microphone 1570. Platform 1502 and/or content services device(s) 1530 may be coupled to a network 1565 to communicate (e.g., send and/or receive) media information to and from network 1565. Content delivery device(s) 1540 also may be coupled to platform 1502, speaker 1560, microphone 1570, and/or to display 1520.

In various implementations, content services device(s) 1530 may include a microphone, a cable television box, personal computer, network, telephone, Internet enabled devices or appliance capable of delivering digital information and/or content, and any other similar device capable of unidirectionally or bidirectionally communicating content between content providers and platform 1502 and speaker subsystem 1560, microphone 1570, and/or display 1520, via network 1565 or directly. It will be appreciated that the content may be communicated unidirectionally and/or bidirectionally to and from any one of the components in system 1500 and a content provider via network 1565. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of controller 1550 may be used to interact with user interface 1522, for example. In implementations, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1504 also may be used to control the motion of articles or selection of commands on the interface 1522.

Movements of the navigation features of controller 1550 may be replicated on a display (e.g., display 1520) by movements of a pointer, cursor, focus ring, or other visual indicators displayed on the display or by audio commands. For example, under the control of software applications 1516, the navigation features located on navigation controller 1550 may be mapped to virtual navigation features displayed on user interface 1522, for example. In implementations, controller 1550 may not be a separate component but may be integrated into platform 1502, speaker subsystem 1560, microphone 1570, and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example, or by auditory command. Program logic may allow platform 1502 to stream content to media adaptors or other content services device(s) 1530 or content delivery device(s) 1540 even when the platform is turned "off." In addition, chipset 1505 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various implementations, platform 1502, speaker 1560, microphone 1570, and/or display 1520 may be an integrated unit. Display 1520, speaker 1560, and/or microphone 1570 and content service device(s) 1530 may be integrated, or display 1520, speaker 1560, and/or microphone 1570 and content delivery device (s) 1540 may be integrated, for example. These examples are not meant to limit the present disclosure.

In various implementations, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 15.

Figure 16:
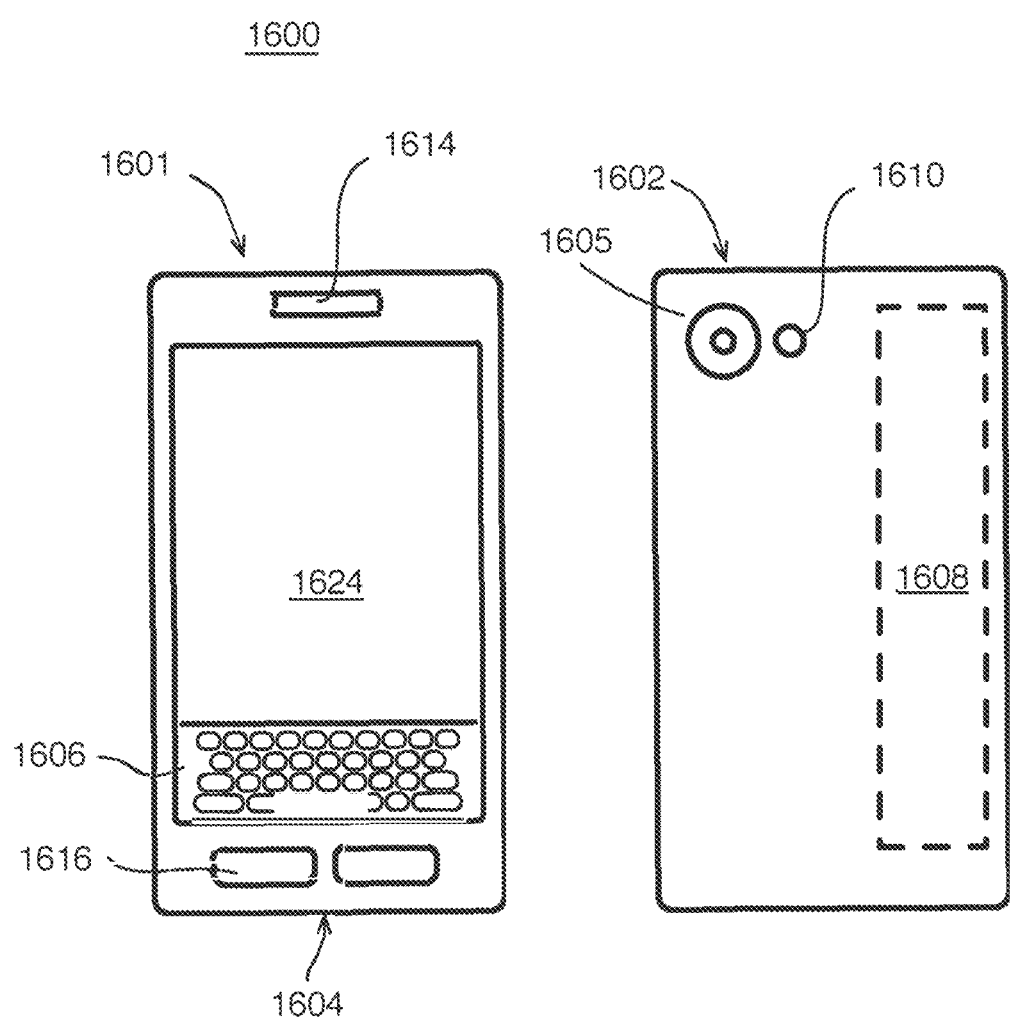
FIG. 16 illustrates another example device, all arranged in accordance with at least some implementations of the present disclosure.

As described above, system 1400 or 1500 may be embodied in varying physical styles or form factors. Referring to FIG. 16, a small form factor device may be arranged in accordance with at least some implementations of the present disclosure. In some examples, system 1400 or 1500 may be implemented via device 1600. In other examples, other devices or systems, or portions thereof may be implemented via device 1600. In various implementations, for example, device 1600 may be implemented as a mobile computing device having wireless capabilities. A mobile computing device may refer to any device having a processing system and a mobile power source or supply, such as one or more batteries, for example.

Examples of a mobile or ultrasound computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 16, device 1600 may include a housing with a front 1601 and a back 1602. Device 1600 includes a display 1624, an input/output (I/O) device 1606, and an integrated antenna 1608. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, speakers 1614, voice recognition device and software, and so forth. Information also may be entered into device 1600 by way of microphone 1604, or may be digitized by a voice recognition device. As shown, device 1600 may include a camera 1605 (e.g., including a lens, an aperture, and an imaging sensor) and a flash 1610 integrated into back 1602 (or elsewhere) of device 1600.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), fixed function hardware, field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer-implemented method of speech recognition comprises receiving audio data of human voice audio to be monitored to detect one or more waking keywords; determining one or more environment indicators comprising using ultrasound to communicate among multiple ultrasound computing devices; and waking one or more applications if the keywords are detected in the audio and depending on the one or more environment indicators.

By one or more second implementation, and further to the first implementation, wherein the environment indicators of at least one of the multiple ultrasound computing devices to indicate whether or not one or more other ultrasound computing devices most likely received the audio by using ultrasound to detect the presence of the one or more other ultrasound computing devices.

By one or more third implementations, and further to the first or second implementation, wherein the environment indicators indicate which computing device of the multiple ultrasound computing devices is closest to a source of the audio.

By one or more fourth implementations, and further to any of the first to third implementation, wherein the method comprising determining which of the multiple ultrasound computing devices is closest to a source of the audio comprising using root-mean-square pressure (RMS) measurements of the audio data at individual ones of the ultrasound computing devices.

By one or more fifth implementations, and further to any of the first to fourth implementation, wherein the method comprising determining which of the multiple ultrasound computing devices are in a same private network, and analyzing ultrasound signals related to root-mean-square pressure (RMS) measurements only from ultrasound computing devices in the private network.

By one or more sixth implementations, and further to any of the first to fifth implementation, wherein the method comprising determining which of the multiple ultrasound computing devices is in a same private network using non-audio wave computer network transmissions; and deactivating wake-on-voice speaker emission responses of individual ones of the multiple ultrasound computing devices on the private network except for a computing device determined to be closest to a source of the audio.

By one or more seventh implementations, and further to any of the first to sixth implementation, wherein the method comprising receiving an ultrasound-transmitted quiet mode code at one or more of the ultrasound computing devices, and de-activating wake-on-voice audio responses on the one or more ultrasound computing devices that received the ultrasound quiet code and when a plurality of the ultrasound computing devices are detected by the one or more ultrasound computing devices.

By one or more eighth implementations, and further to any of the first to seventh implementation, wherein a first ultrasound computing device transmits, via a non-audio wave computer network, a password code to a second authorizing computing device, and wherein the environment indicator is the password code transmitted from the second authorizing ultrasound computing device and back to the first ultrasound computing device via ultrasound signal to permit a user to awaken the one or more applications on the first computing device.

By one or more ninth implementations, and further to any of the first to eighth implementation, wherein the environment indicators indicates whether an ultrasound computing device is at least partly covered by a container holding the ultrasound computing device.

By one or more tenth implementations, a computer-implemented system comprising memory; at least one processor communicatively connected to the memory and being arranged to operate by: receiving audio data of human voice audio to be monitored to detect one or more waking keywords; determining one or more environment indicators comprising using ultrasound to communicate among multiple ultrasound computing devices; and waking one or more applications if the keywords are detected in the audio and depending on the one or more environment indicators.

By one or more eleventh implementations, and further to the tenth implementation, wherein the method comprising, wherein the environment indicators indicate the presence of other ultrasound computing devices relative to a first ultrasound computing device comprising using a chirp-type ultrasound signal that varies the ultrasound waves over time and differently for individual ultrasound computing devices.

By one or more twelfth implementations, and further to tenth or eleventh implementation, wherein the at least one processor is arranged to operate by determining which of the multiple ultrasound computing devices is closest to a source of the audio comprising using time-ordered ultrasound transmissions each from a different ultrasound computing device.

By one or more thirteenth implementations, and further to the tenth to the twelfth implementations, wherein the at least one processor is arranged to operate by determining which of the multiple ultrasound computing devices is closest to a source of the audio comprising using root-mean-square pressure (RMS) measurements of the audio data at individual ones of the ultrasound computing devices.

By one or more fourteenth implementations, and further to the tenth to twelfth implementations, wherein the at least one processor is arranged to operate by determining which of the multiple ultrasound computing devices is closest to a source of the audio comprising using root-mean-square pressure (RMS) measurements of the audio data at individual ones of the ultrasound computing devices, and wherein the memory holds a list of RMS levels individually pre-assigned to ordered time-slots so that the individual ultrasound computing devices transmit an ultrasound signal at a time-slot associated with a corresponding RMS level at the individual ultrasound computing devices.

By one or more fifteenth implementations, and further to the tenth to twelfth implementations, wherein the at least one processor is arranged to operate by determining which of the multiple ultrasound computing devices is closest to a source of the audio comprising using root-mean-square pressure (RMS) measurements of the audio data at individual ones of the ultrasound computing devices, and wherein the memory holds a list of RMS levels individually pre-assigned to ordered time-slots so that the individual ultrasound computing devices transmit an ultrasound signal at a time-slot associated with a corresponding RMS level at the individual ultrasound computing devices, and wherein the highest RMS level corresponds to an ultrasound signal transmitted at a first transmitting time slot relative to the transmission of other time slots of other ultrasound computing devices.

By one or more sixteenth implementations, and further to the tenth to twelfth implementations, wherein the at least one processor is arranged to operate by determining which of the multiple ultrasound computing devices is closest to a source of the audio comprising using root-mean-square pressure (RMS) measurements of the audio data at individual ones of the ultrasound computing devices, and wherein the memory holds a list of RMS levels individually pre-assigned to ordered time-slots so that the individual ultrasound computing devices transmit an ultrasound signal at a time-slot associated with a corresponding RMS level at the individual ultrasound computing devices, and wherein the waking comprises waking the one or more applications on an ultrasound computing device that transmitted an ultrasound signal at the earliest time slot and de-activating the wake-on-voice response on one or more ultrasound computing devices that are assigned to later time slots.

By one or more seventeenth implementations, and further to the tenth to twelfth implementations, wherein the at least one processor is arranged to operate by determining which of the multiple ultrasound computing devices is closest to a source of the audio comprising using root-mean-square pressure (RMS) measurements of the audio data at individual ones of the ultrasound computing devices, and wherein the memory holds a list of RMS levels individually pre-assigned to ordered time-slots so that the individual ultrasound computing devices transmit an ultrasound signal at a time-slot associated with a corresponding RMS level at the individual ultrasound computing devices, and wherein the at least one processor is arranged to operate by comprising deactivating a wake-on-voice response of ultrasound computing devices that are assigned the same time slot.

By one or more eighteenth implementations, at least one computer readable medium comprising a plurality of instructions that in response to being executed on a computing device, causes the computing device to operate by: determining one or more environment indicators comprising using ultrasound to communicate among multiple ultrasound computing devices; receiving audio data of human voice audio to be monitored to detect one or more waking keywords; and waking one or more applications if the keywords are detected in the audio and depending on the one or more environment indicators.

By one or more nineteenth implementations, and further to the eighteenth implementation, wherein the environment indicators of at least one of the multiple ultrasound computing devices indicates one or more ultrasound computing devices are members in a proximity group.

By one or more twentieth implementations, and further to the eighteenth or nineteenth implementation, wherein the at least one processor is arranged to operate by determining which of the multiple ultrasound computing devices in a proximity group is closest to a source of the audio comprising using time-ordered ultrasound transmissions each from a different ultrasound computing device.

By one or more twenty-first implementations, and further to any one of the eighteenth to twentieth implementations, wherein the determining comprises establishing membership, via ultrasound signal, of at least two ultrasound computing devices in a proximity group; and determining which of the ultrasound devices in the proximity group is a closest device to an audio source comprising transmitting, via non-audio computer network, among the ultrasound computing devices wake-on-voice audio root-mean-square pressure (RMS) levels.

By one or more twenty-second implementations, and further to any one of the eighteenth to twentieth implementations, wherein the determining comprises establishing membership, via ultrasound signal, of at least two ultrasound computing devices in a proximity group; and determining which of the ultrasound devices in the proximity group is a closest device to an audio source comprising transmitting, via non-audio computer network, among the ultrasound computing devices wake-on-voice audio root-mean-square pressure (RMS) levels, and wherein the determining of a closest device comprises the at least one ultrasound computing device transmitting to the hub, via non-audio wave computer network, proximity group data comprising a root-mean-square pressure (RMS) level of received audio, a user ID, and the at least one ultrasound computing device receiving the proximity data from at least one other ultrasound computing device of the proximity group.

By one or more twenty-third implementations, and further to any one of the eighteenth to twentieth implementation, wherein the determining comprises establishing membership, via ultrasound signal, of at least two ultrasound computing devices in a proximity group; and determining which of the ultrasound devices in the proximity group is a closest device to an audio source comprising transmitting, via non-audio computer network, among the ultrasound computing devices wake-on-voice audio root-mean-square pressure (RMS) levels, and wherein the determining of the closest device comprises the at least one ultrasound computing device transmitting data comprising a root-mean-square pressure (RMS) level of received audio, via non-audio wave computer network, to multiple other ultrasound computing devices in a same proximity group.

By one or more twenty-fourth implementations, and further to any one of the eighteenth to twenty-third implementations, wherein the environment indicator is an indication of a meeting to at least one ultrasound computing device by receipt of an ultrasound broadcast code in the form of a chirp indicating that the ultrasound computing device receiving the broadcast code should deactivate its wake-on-voice responses.

By one or more twenty-fifth implementations, and further to any one of the eighteenth to twenty-fourth implementation, wherein a first ultrasound computing device transmits, via a non-audio wave computer network, a password code to a second authorizing computing device, and wherein the environment indicator is the password code transmitted from the second authorizing ultrasound computing device and back to the first ultrasound computing device via an ultrasound pulsed signal to permit a user to awaken the one or more applications on the first computing device.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, causes the computing device to perform a method according to any one of the above implementations.

In one or more twenty-eighth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of speech recognition, comprising:
   determining which of a plurality of ultrasound computing devices is in a same private network using non-audio wave computer network transmissions including receiving and transmitting an ultrasound code;
   receiving audio data of human voice audio to be monitored to detect one or more waking keywords;
   generating a keyword score for a selected keyword based on the audio data;
   determining the keyword score passes a threshold;
   determining the selected keyword is present in the audio data;
   determining, in parallel with determining the selected keyword is present, one or more environment indicators comprising using ultrasound to communicate among the plurality of ultrasound computing devices in the same private network, wherein the one or more environment indicators is the ultrasound code transmitted via an ultrasound pulsed signal; and waking one or more applications based on the keywords detected in the audio data and depending on the one or more environment indicators.

2. The method of claim 1 wherein the environment indicators of at least one of the plurality of ultrasound computing devices indicate that one or more other ultrasound computing devices most likely received the audio by using ultrasound to detect the presence of the one or more other ultrasound computing devices.

3. The method of claim 1 wherein the environment indicators indicate which computing device of the plurality of ultrasound computing devices is closest to a source of the audio.

4. The method of claim 1 comprising determining which of the plurality of ultrasound computing devices is closest to a source of the audio comprising using root-mean-square pressure (RMS) measurements of the audio data at individual ones of the ultrasound computing devices and assigning selected ultrasound transmission time slots to each of the plurality of ultrasound computing devices based on corresponding RMS measurements.

5. The method of claim 1 comprising determining which of the plurality of ultrasound computing devices are in a same private network including receiving and re-transmitting an ultrasound code, wherein the ultrasound code is one of an ultrasound pin and a unique signature, and analyzing ultrasound signals related to root-mean-square pressure (RMS) measurements only from ultrasound computing devices in the private network.

6. The method of claim 1, wherein the ultrasound code is one of an ultrasound pin and a unique signature; and deactivating wake-on-voice speaker emission responses of individual ones of the plurality of ultrasound computing devices on the private network except for a computing device determined to be closest to a source of the audio data.

7. The method of claim 1 comprising receiving an ultrasound-transmitted quiet mode code at one or more of the plurality of ultrasound computing devices, and de-activating wake-on-voice audio responses on the one or more ultrasound computing devices that received the ultrasound quiet code.

8. The method of claim 1 wherein a first ultrasound computing device of the plurality of ultrasound computing devices transmits, via a non-audio wave computer network, the ultrasound code to a second authorizing computing device, and wherein the environment indicator is the ultrasound code transmitted from the second authorizing computing device and back to the first ultrasound computing device via ultrasound signal to permit a user to awaken the one or more applications on the first ultrasound computing device.

9. The method of claim 1 wherein the environment indicators indicate that a first ultrasound computing device of the plurality of ultrasound computing devices is at least partly covered by a container holding the first ultrasound computing device.

10. A computer-implemented system, comprising:
memory;
at least one processor communicatively connected to the memory and being arranged to operate by:
determining which of a plurality of ultrasound computing devices is in a same private network using non-audio wave computer network transmissions including receiving and transmitting an ultrasound code;
receiving audio data of human voice audio to be monitored to detect one or more waking keywords;
generating a keyword score for a selected keyword based on the audio data;
determining the keyword score passes a threshold;
determining the selected keyword is present in the audio data;
determining, in parallel with determining the selected keyword is present, one or more environment indicators comprising using ultrasound to communicate among the plurality of ultrasound computing devices in the same private network, wherein the one or more environment indicators is the ultrasound code transmitted via an ultrasound pulsed signal; and
waking one or more applications based on the keywords detected in the audio data and depending on the one or more environment indicators.

11. The system of claim 10 using ultrasound to communicate among the plurality of ultrasound computing devices includes using a chirp-type ultrasound signal that varies ultrasound waves over time and differently for each ultrasound computing device of the plurality of ultrasound computing devices.

12. The system of claim 10 wherein the at least one processor is arranged to operate by determining which of the plurality of ultrasound computing devices is closest to a source of the audio data comprising using time-ordered ultrasound transmissions each from a different ultrasound computing device of the plurality of ultrasound computing devices.

13. The system of claim 10 wherein the at least one processor is arranged to operate by determining which of the plurality of ultrasound computing devices is closest to a source of the audio data comprising using root-mean-square pressure (RMS) measurements of the audio data at individual ones of the plurality of ultrasound computing devices.

14. The system of claim 13 wherein the memory holds a list of RMS levels individually pre-assigned to ordered time-slots so that the individual ultrasound computing devices of the plurality of ultrasound computing devices each transmit an ultrasound signal at a time-slot associated with a corresponding RMS level at the respective individual ultrasound computing devices.

15. The system of claim 14 wherein a highest RMS level of the list of RMS levels corresponds to an ultrasound signal transmitted at a first transmitting time slot relative to other transmitting time slots of other respective ultrasound computing devices.

16. The system of claim 14 wherein waking the one or more applications comprises waking the one or more applications on a selected ultrasound computing device of the plurality of ultrasound computing devices, wherein the selected ultrasound computing device transmitted a respective ultrasound signal at an earliest time slot, and de-activating the wake-on-voice response on one or more other ultrasound computing devices of the plurality of ultrasound computing devices that are assigned to later time slots.

17. The system of claim 14 wherein the at least one processor is arranged to operate by deactivating a wake-on-voice response of ultrasound computing devices that are assigned the same time slot.

18. At least one computer readable medium comprising a plurality of instructions that in response to being executed on a computing device, causes the computing device to operate by:
- determining one or more environment indicators comprising using ultrasound to communicate among a plurality of ultrasound computing devices;
- determining which of the plurality of ultrasound computing devices is in a same private network using non-audio wave computer network transmissions including receiving and transmitting an ultrasound code, wherein the one or more environment indicators is the ultrasound code transmitted via an ultrasound pulsed signal;
- receiving audio data of human voice audio to be monitored to detect one or more waking keywords;
- generating a keyword score for a selected keyword based on the audio data;
- determining the keyword score passes a threshold;
- determining, in parallel with determining the one or more environment indicators, the selected keyword is present in the audio data; and
- waking one or more applications based on the keywords detected in the audio and depending on the one or more environment indicators.

19. The medium of claim 18 wherein the environment indicators of at least one of the plurality of ultrasound computing devices indicates one or more ultrasound computing devices are members in a proximity group.

20. The medium of claim 18 wherein the at least one processor is arranged to operate by determining which of the plurality of ultrasound computing devices in a proximity group is closest to a source of the audio data comprising using time-ordered ultrasound transmissions each from a different ultrasound computing device of the plurality of ultrasound computing devices.

21. The medium of claim 18 wherein determining the one or more environment indicators further comprises:
- establishing membership, via ultrasound signal, of at least two ultrasound computing devices of the plurality of ultrasound computing devices, in a proximity group; and
- determining which of the at least two ultrasound computing devices in the proximity group is a closest device to an audio source of the audio data, comprising transmitting, via non-audio computer network, among the at least two ultrasound computing devices wake-on-voice audio root-mean-square pressure (RMS) levels.

22. The medium of claim 21 wherein determining the closest device comprises a selected ultrasound computing device of the proximity group transmitting to a hub, via ultrasound, proximity group data comprising a root-mean-square pressure (RMS) level of received audio data, a user ID, and the selected ultrasound computing device receiving the proximity group data from at least one other ultrasound computing device of the proximity group.

23. The medium of claim 21 wherein determining the closest device comprises a selected ultrasound computing device of the proximity group transmitting data comprising a root-mean-square pressure (RMS) level of received audio data, via non-audio wave computer network, to other ultrasound computing devices in the proximity group.

24. The medium of claim 18 wherein the environment indicator is an indication of a meeting to at least one ultrasound computing device of the plurality of ultrasound computing devices, by receipt of an ultrasound broadcast code in the form of a chirp indicating that the at least one ultrasound computing device receiving the broadcast code should deactivate its wake-on-voice responses.

25. The medium of claim 18 wherein a first ultrasound computing device of the plurality of ultrasound computing devices transmits, via the non-audio wave computer network, the ultrasound code to a second authorizing computing device, and wherein the environment indicator is the ultrasound code transmitted from the second authorizing computing device and back to the first ultrasound computing device via the ultrasound pulsed signal to permit a user to awaken the one or more applications on the first ultrasound computing device.

* * * * *